US009890260B2

(12) United States Patent
Paulussen et al.

(10) Patent No.: US 9,890,260 B2
(45) Date of Patent: Feb. 13, 2018

(54) PLASMA ASSISTED HYDROPHILICITY ENHANCEMENT OF POLYMER MATERIALS

(71) Applicant: VITO NV (VLAAMSE INSTELLING VOOR TECHNOLOGISCH ONDERZOEK NV), Mol (BE)

(72) Inventors: Sabine Paulussen, Deurne (BE); Gabriella Da Ponte, Kraainem (BE)

(73) Assignee: VITO NV (VLAAMSE INSTELLING VOOR TECHNOLOGISCH ONDERZOEK NV), Mol (BE)

( * ) Notice: Subject to any disclaimer, the term of this patent is extended or adjusted under 35 U.S.C. 154(b) by 0 days.

(21) Appl. No.: 15/143,017

(22) Filed: Apr. 29, 2016

(65) Prior Publication Data

US 2016/0319091 A1    Nov. 3, 2016

(30) Foreign Application Priority Data

Apr. 30, 2015    (EP) .................................... 15166054

(51) Int. Cl.
| B01D 71/32 | (2006.01) |
| B01D 71/34 | (2006.01) |
| B01D 71/78 | (2006.01) |
| B01D 71/82 | (2006.01) |
| B05D 3/14 | (2006.01) |
| B29C 59/14 | (2006.01) |
| C08J 7/12 | (2006.01) |
| C08J 7/14 | (2006.01) |
| C08J 7/18 | (2006.01) |
| B01D 67/00 | (2006.01) |
| C08F 259/08 | (2006.01) |
| C08F 283/00 | (2006.01) |
| B01D 65/08 | (2006.01) |
| B01D 71/68 | (2006.01) |
| B01D 71/36 | (2006.01) |

(52) U.S. Cl.
CPC ............... C08J 7/18 (2013.01); B01D 65/08 (2013.01); B01D 67/009 (2013.01); B01D 67/0093 (2013.01); B05D 3/141 (2013.01); B05D 3/142 (2013.01); B05D 3/144 (2013.01); B29C 59/14 (2013.01); C08F 259/08 (2013.01); C08F 283/00 (2013.01); C08J 7/123 (2013.01); C08J 7/14 (2013.01); B01D 71/34 (2013.01); B01D 71/36 (2013.01); B01D 71/68 (2013.01); B01D 2323/02 (2013.01); B01D 2323/42 (2013.01); B29K 2995/0092 (2013.01); C08J 2327/16 (2013.01); C08J 2381/06 (2013.01)

(58) Field of Classification Search
CPC .. B01D 65/08; B01D 67/009; B01D 67/0093; B01D 2323/02; B01D 2323/42; B01D 71/34; B01D 71/36; B01D 71/68; B29K 2995/0092; B05D 3/141; B05D 3/142; B05D 3/144; B29C 59/14; C08F 259/08; C08F 283/00; C08J 7/14; C08J 7/18; C08J 2327/16; C08J 2381/06
See application file for complete search history.

(56) References Cited

U.S. PATENT DOCUMENTS 5,080,924 A    1/1992 Kamel et al.

FOREIGN PATENT DOCUMENTS

| CN | 103263863 A | 8/2013 |
| WO | 2007127989 A2 | 11/2007 |
| WO | 2008060522 A2 | 5/2008 |
| WO | 2009037331 A1 | 3/2009 |

OTHER PUBLICATIONS

Mévellec, V. et al. Chemsitry of Materials vol. 19, pp. 6323-6330 (Nov. 2007).*
European Search Report from European Patent Application No. 15166054.5, dated Nov. 6, 2015, 5 pages.

* cited by examiner

Primary Examiner — Irina S Zemel
Assistant Examiner — Jeffrey Lenihan
(74) Attorney, Agent, or Firm — Merchant & Gould P.C.

(57) ABSTRACT

A method of enhancing hydrophilicity of a hydrophobic polymer material includes pre-treating the hydrophobic polymer material, comprising treating the hydrophobic polymer material with a first atmospheric pressure plasma discharge in a first atmosphere. The first atmosphere includes ammonia to obtain a pre-treated polymer material. The method includes treating the pre-treated polymer material with a second atmospheric pressure plasma discharge in a second atmosphere in which an aerosol of a carboxylic acid is introduced. A substrate is provided as well, the substrate including a hydrophobic polymer material having a modified interface, wherein the modified interface includes carboxylic functional groups grafted on the hydrophobic polymer material, the modified interface having a contact angle with water, which, measured after immersion in water at 20° C. for 3 days, is at least 25° less than a contact angle with water of the hydrophobic polymer material.

17 Claims, 12 Drawing Sheets

PLASMA ASSISTED HYDROPHILICITY ENHANCEMENT OF POLYMER MATERIALS

CROSS REFERENCE TO RELATED APPLICATIONS

This application claims benefit of Ser. No. 15166054.5, filed 30 Apr. 2015 in Europe and is incorporated herein by reference. To the extent appropriate, a claim of priority is made to the above disclosed application.

BACKGROUND OF THE INVENTION

The present invention is related to methods of plasma treatment of polymer materials in order to modify the surface of these materials for improving the hydrophilic character of the surfaces, and to materials obtained by such methods. The plasma treatment involves an atmospheric pressure plasma.

A lot of polymers having a stable structure, which resists attack from various solvents, or from environmental conditions, have the drawback of being poorly wettable. Surface wettability is however an interesting property for industrial applications. In the prior art, attempts have been made to modify the surface of such polymer materials by a plasma treatment.

WO 2009/037331 describes to apply a hydrophilic coating on a substrate by exposing the substrate to an atmospheric pressure plasma discharge in which an aerosol of a non-polymerizable acetate derivative, such as ethyl acetate, is introduced. Treatment of poly(ethylene terephtalate) with this method resulted in a reduction of the contact angle with water from 67° to 10° and for poly(propylene) a reduction from 98° to 10° was reported. The reduction is reported to be stable for several months.

US 2011/0060402 describes methods for surface modifying a hydrophobic polymer such as expanded poly tetrafluoroethylene (ePTFE) by treating the hydrophobic polymer sequentially with low pressure (sub atmospheric) plasmas, dip coating the hydrophobic polymer material with a hydrophilic coating, e.g. polyethylene glycol (PEG) acrylate, and polymerizing the hydrophilic coating by exposure to a low pressure plasma.

CN 103263863 describes a method of improving the surface hydrophilicity of a polyether sulfone (PES) ultrafiltration membrane by treating the membrane using a low temperature plasma discharge, and by grafting an acrylic monomer on the plasma treated membrane in a vacuum oven. An increase of pure water flux of the membrane is reported.

The inventors have observed that in most cases the hydrophilic properties of the modified surface regressed with time, in particular when the surface is contacted with water.

An objective of aspects of the present invention is to provide an improved method of modifying the surface of a hydrophobic polymer. An objective of further aspects of the present invention is to provide a hydrophobic polymer material having a surface which is modified to have improved hydrophilic properties. It is an object to provide such methods and/or materials which provide improved stability of one or more hydrophilic properties when the surface is aged in water. It is also an object to provide such methods and/or materials which are easier to implement or manufacture and which are more cost effective.

According to a first aspect of the invention, there is therefore provided a method for enhancing hydrophilicity of a hydrophobic polymer material, as set out in the appended claims.

According to a second aspect of the invention, there is provided a substrate comprising, or consisting of a hydrophobic polymer material having a modified interface, as set out in the appended claims.

According to another aspect of the invention, which alternatively can be combined with any of the previous aspects of the invention, there is provided a method of plasma treating a hydrophobic polymer material, said method comprising arranging the hydrophobic polymer material on a porous support and applying suction pressure through the porous support during the plasma treating.

BRIEF DESCRIPTION OF THE DRAWINGS

Aspects of the invention will now be described in more detail with reference to the appended drawings, wherein same reference numerals illustrate same features and wherein:

FIG. 7A: WCA vs frames for top side of GVS_3 μm membrane; FIG. 7B: WCA vs frames for bottom side of GVS_3 μm membrane; FIG. 7C: WCA vs frames for top side of GVS_0.2 μm membrane; FIG. 7D: WCA vs frames for bottom side of GVS_0.2 μm membrane; FIG. 7E: WCA vs frames for top side of Millipore_0.2 μm membrane; and FIG. 7F: WCA vs frames for bottom side of Millipore_0.2 μm membrane.

FIG. 8A: SEM picture of untreated GVS_3 μm membrane; FIG. 8B: SEM picture of GVS_3 μm membrane after 15 passes of plasma treatment (Sample 7, Table 7); and FIG. 8C: SEM picture of GVS_3 μm membrane after 30 passes of plasma treatment (Sample 5, Table 7).

FIG. 9A: WCA vs frames for top side of Millipore_0.2 μm membrane before water immersion; FIG. 9B: WCA vs frames for bottom side of Millipore_0.2 μm membrane before water immersion; FIG. 9C: WCA vs frames for top side of Millipore_0.2 μm membrane after immersion in water for 96 h; and FIG. 9D: WCA vs frames for bottom side of Millipore 0.2 μm membrane after immersion in water for 96 h.

DETAILED DESCRIPTION

Figure 1:
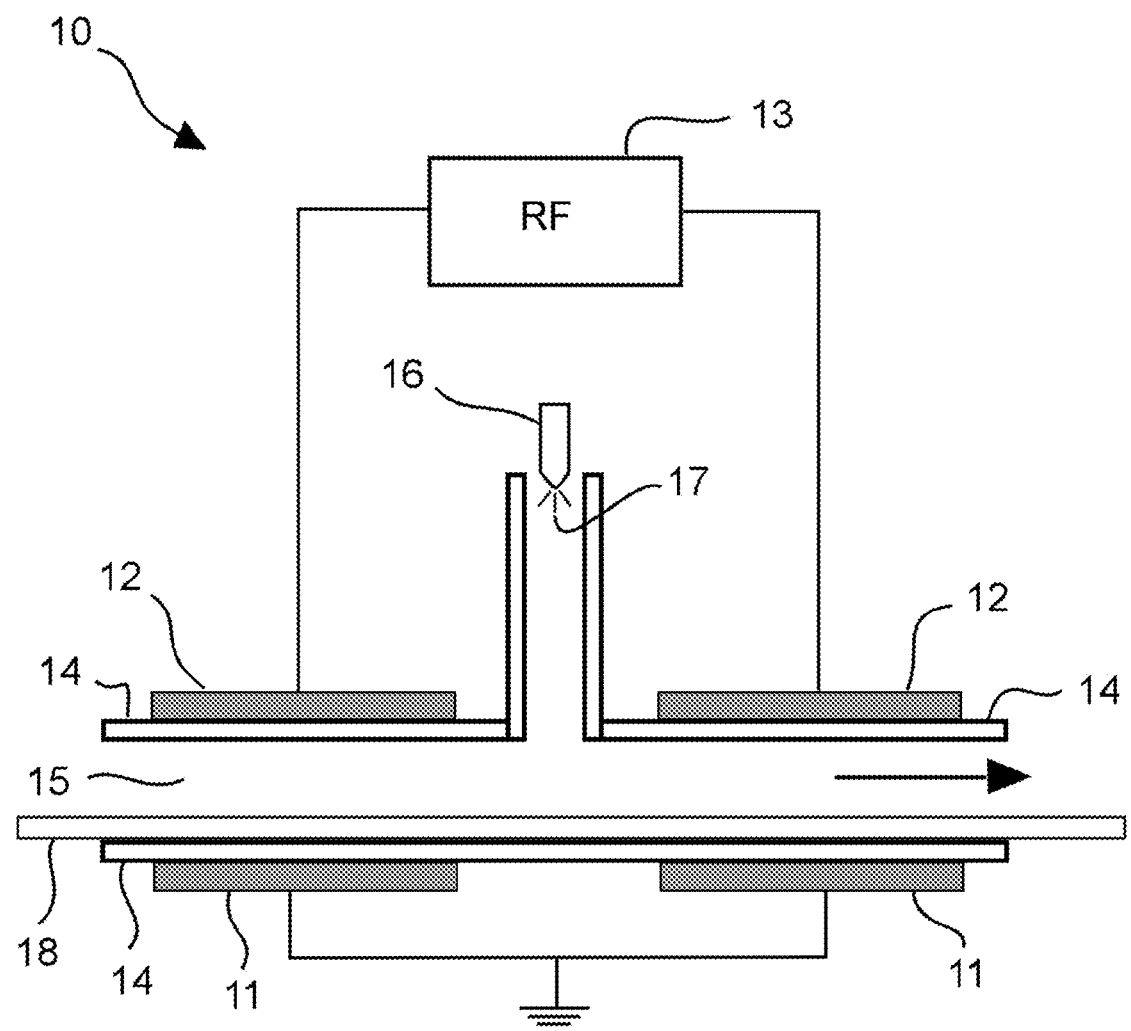
FIG. 1 represents a schematic view of a dielectric barrier discharge apparatus as can be used in methods of the present invention.

A (untreated, native) hydrophobic polymer material advantageously refers to a polymer material having a contact angle with water of at least 65°, advantageously at least 69°. Hydrophobic materials include but are not limited to: poly(ethylene terephtalate) (PET), polyethylene (PE), polystyrene (PS), polycarbonate (PC), polypropylene (PP), polyvinyl chloride (PVC), or polyvinylidene chloride (PVDC).

The hydrophobic materials suitable in aspects of the present invention are advantageously fluorinated polymers, such as poly(tetra fluoroethylene) (PTFE), polyvinilydene fluoride (PVDF), polyvinyl fluoride (PVF), or perfluoroalkoxy alkane (PFA). More advantageously, the fluorinated polymers are polytetrafluoroethylene (PTFE), polyvinylidene fluoride (PVDF), or perfluoroalkoxy alkane (PFA).

The hydrophobic materials suitable in aspects of the present invention are advantageously sulfonated polymers, such as polysulfone (PSU), polyether sulfone (PES), or polyphenylene sulphide (PPS). More advantageously, the sulfonated polymers are polyethersulfone (PES), or polysulfone (PSU).

The hydrophobic materials suitable in aspects of the present invention can be provided in the form of films, sheets, plates or panels. They can be powders or granular materials. Particularly advantageous are hydrophobic polymer materials provided in a porous form, such as semi-permeable membranes, in particular membranes having a pore size of at least 20 nm, advantageously at least 50 nm. There is a risk that pores smaller than the indicated sizes would become damaged during treatment according to methods of the invention. Suitable semi-permeable membranes are microfiltration and ultrafiltration membranes.

The semi-permeable membranes as referred to in the present description are advantageously membranes obtained by subjecting a polymer solution to a phase separation process. Phase separation, which is also referred to as phase inversion, is a well-known process wherein demixing between the polymer and the solvent is induced. As a result of demixing, the polymer precipitates, thereby forming a membrane lattice with a desired structure (pore size, pore structure, etc.). Further process steps can be carried out in order to remove the solvent completely (e.g., washing in a possibly hot water bath) and to obtain a final pore structure (e.g., removing pore formers by washing in a bleach solution). Demixing can be induced based on several techniques. One possibility is thermally induced phase separation (TIPS), wherein demixing is induced by a temperature change at the interface of the polymer solution. Another possibility is to induce a chemical reaction in the polymer solution, causing demixing. This is referred to as reaction induced phase separation (RIPS). However, in the vast majority of cases, demixing is induced by phase diffusion. The polymer solution is contacted with another phase, being a liquid (liquid induced phase separation or LIPS), or a gas (vapour, referred to as vapour induced phase separation or VIPS), which is a non-solvent of the polymer but which is miscible with the solvent of the polymer solution. The liquid or vapour will diffuse through the polymer solution and cause a local change in the polymer solution composition, inducing demixing. As a result, the polymer precipitates from the solution. LIPS is also referred to as immersion precipitation. It will be convenient to note that any phase separation process can be applied to prepare the membranes as described herein.

The membrane comprises or consists of an advantageously thermoplastic polymer compound, which is the hydrophobic polymer material. The hydrophobic polymer material is the principal or primary polymeric compound used for preparing the membrane forming solution, e.g. the polymer compound present in largest amount in the membrane forming solution.

The amount of the hydrophobic polymer material in the (dry) (final) membrane is advantageously at least 5% by weight, advantageously at least 10% by weight, advantageously at least 25% by weight, advantageously at least 35% by weight, advantageously at least 50% by weight. The hydrophobic polymer material advantageously forms an organic binder forming a matrix or lattice of the membrane, in which a filler material may optionally be dispersed. The filler material may be organic and can be an amine, such as but not limited to one or a combination of: monoethanolamine (MEA), diethanolamine (DEA), polyethylenimine (PEI), aminopropyl-trimethoxysilane and polyethylenimine-trimethoxysilane. The filler material can be an amide or amine containing polymer, such as but not limited to one or a combination of: polyamide (PA), polyurethane (PUR), polyvinylamine (PVAm) and melamine. The filler material may be inorganic, such as one or a combination of $TiO_2$, $HfO_2$, $Al_2O_3$, $ZrO_2$, $Zr_3(PO_4)_4$, $Y_2O_3$, $SiO_2$, carbon, possibly on Pt, Ru or Rh support, $BaSO_4$, $BaTiO_3$, perovskite oxide powder materials, zeolites, metal-organic frameworks (MOF) and silicon carbides. Functionalized variants of the filler materials (such as aminated, sulfonated, acrylated) can be used. Combinations of the above organic and inorganic materials can be used as well as filler material.

The membrane may be reinforced with a support.

Methods of enhancing the hydrophilicity of polymers according to aspects of the present invention comprise a pre-treatment step and a plasma treatment step. The pre-treatment step is also a plasma treatment.

The plasma in both the pre-treatment and the treatment step is an atmospheric pressure plasma. Such atmospheric pressure plasma is advantageously obtained by dielectric barrier discharge (DBD) technology.

Referring to FIG. 1, in a DBD apparatus 10, the plasma is generated between two parallel and oppositely arranged electrodes 11, 12, which can be made of metal, such as stainless steel. One electrode 11 is advantageously grounded, whereas the other electrode 12 can be electrically connected to a high voltage (HV) generator 13 (AC), operable to provide a high voltage (1-40 kV), advantageously at a frequency between 1 kHz and 100 kHz.

One of the electrodes, and advantageously both are covered with a dielectric layer 14, such as glass, at the side facing the opposite electrode. The electrodes 11, 12 are spaced apart to provide a gap 15 between them (or between the dielectric layers 14) having a clearance which is usually limited to several millimeters, such as between 1 mm and 5 mm, to ensure stable plasma operation.

In order to obtain a plasma discharge, a plasma gas, such as nitrogen or argon, is made to flow in the gap 15 by means known in the art. In addition to the plasma gas, chemical precursors can be introduced in the atmosphere in gap 15.

Typical chemical precursors are liquid and are generally nebulized with appropriate atomizers 16 to produce an aerosol 17. Droplet sizes are distributed in the range of 10-200 nm with advantageously a maximum concentration in the range between 20 nm and 100 nm, advantageously between 25 nm and 75 nm, advantageously around 50 nm. Such low particle size generated by the atomizer ensures optimum reaction conditions in the plasma. The chemical precursors can either be carried along with the plasma gas, or can be directly introduced in the gap 15, depending on where the atomizer 16 is arranged.

The DBD set-up is ideally suited for treatment of plastic foils or films 18 and the materials treated are in direct contact with the plasma.

Figure 2:
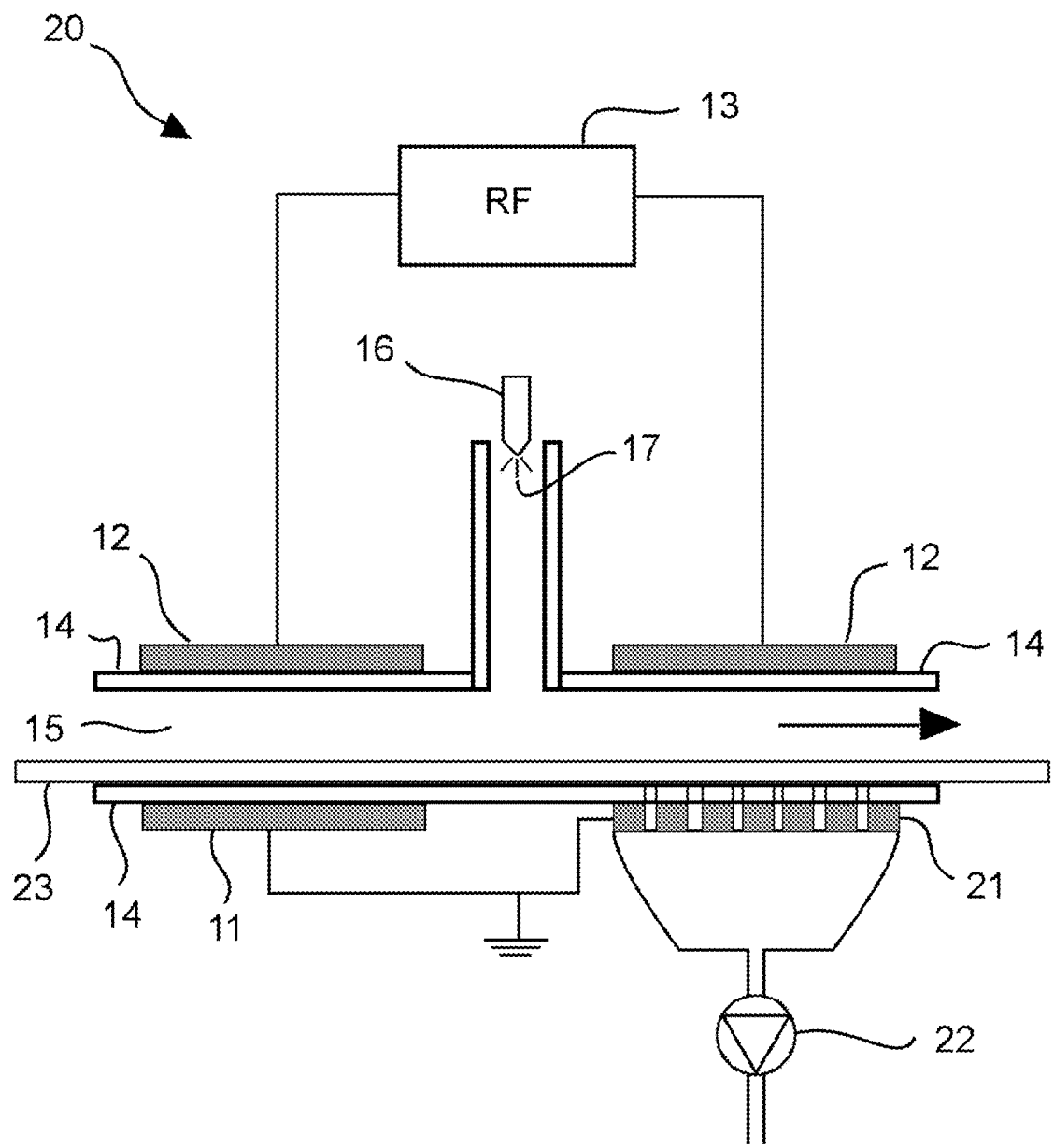
FIG. 2 represents a schematic view of an alternative dielectric barrier discharge apparatus, particularly suited for treatment of porous materials.

Referring to FIG. 2, an alternative DBD apparatus 20 differs from DBD apparatus 10 in that the ground electrode 11 is replaced with a porous electrode 21, possibly formed of a metal mesh, which possibly acts as ground electrode. A vacuum pump 22 is fluidly connected with the side of porous electrode 21 opposite the HV electrode 12. In the DBD apparatus 20, no dielectric layer is provided on the porous electrode 21, although one may be provided if desired.

The set-up of FIG. 2 is suitable for treatment of porous materials, such as semi-permeable membranes 23. These porous materials 23 are advantageously placed on the porous electrode 21 during plasma treatment. The vacuum pump 22 is arranged to apply suction pressure (vacuum or slight underpressure) by the vacuum pump through the pores of porous electrode 21, which will advantageously suck the plasma gas, and possibly any chemical precursor into the porous structure of the material 23. The generation of suction pressure (vacuum or slight underpressure) by the vacuum pump 22 is intended to encourage the reactive species generated in the plasma to pass through the pore network of the material 23 inducing a proper functionalization of the external and internal part of the membrane. An in-depth treatment is therefore obtained.

Figure 3:
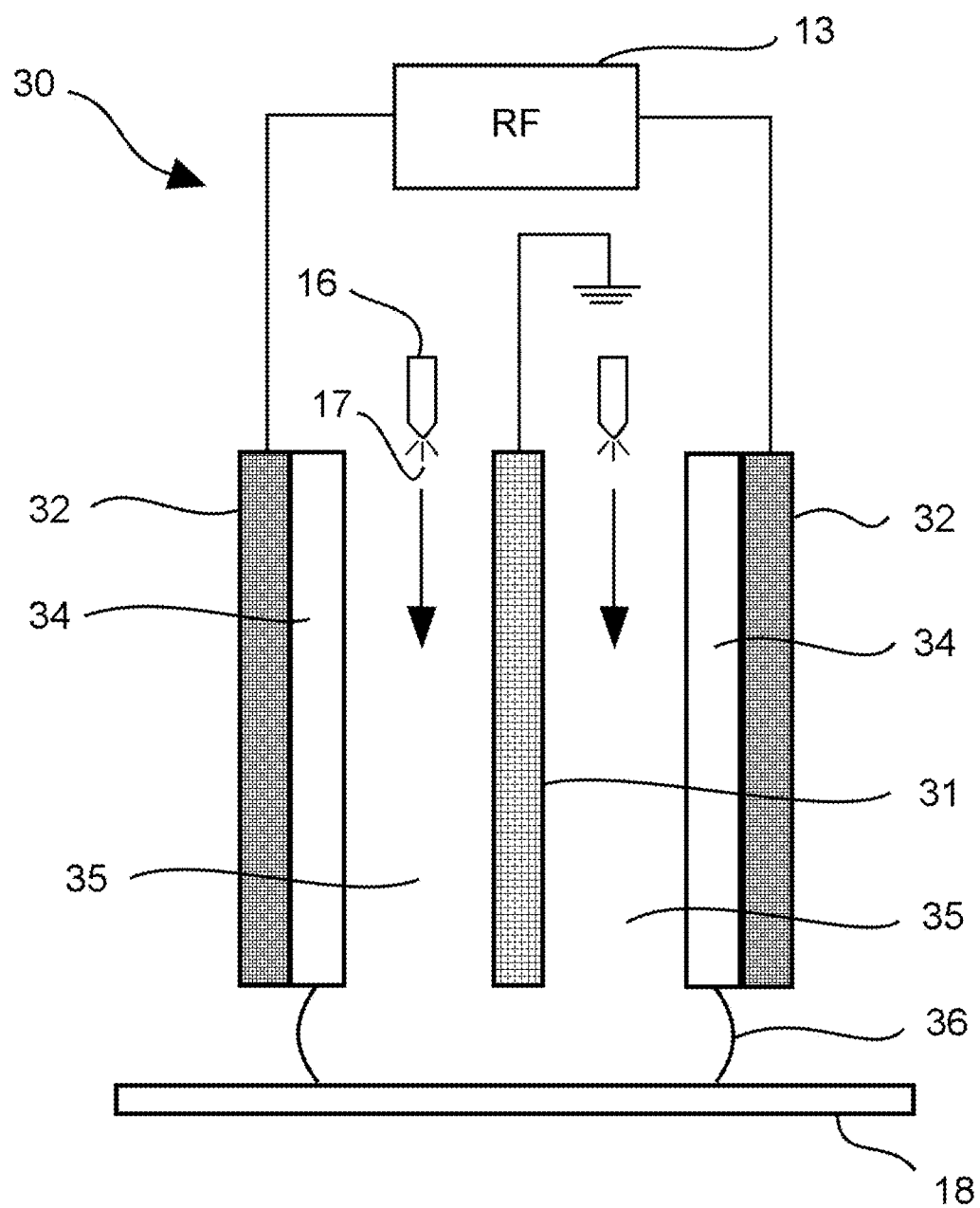
FIG. 3 represents a schematic view of a plasma torch as can be used in methods of the present invention.

An alternative plasma treatment apparatus which can be used in methods according to the present invention is shown in FIG. 3. Depicted is a so called plasma torch 30, comprising a possibly grounded elongated central electrode 31, surrounded by a HV electrode 32. The HV electrode 32, the central electrode 31, or both can be covered with a dielectric layer 34 on the side facing the other electrode. The electrodes 31, 32 are spaced apart to define a gap 35 axially around the central electrode 31. The plasma is generated in this gap 35 by making a plasma gas flow along the gap. The plasma gas can be a same gas as for the DBD apparatuses described above, possibly with chemical precursors as described. It will hence be clear that the plasma generated in plasma torch 30 is also a DBD plasma discharge.

At the outlet of torch 30, where the plasma gas is blown out of the torch, a so-called afterglow 36 is formed, referring to a gas which has just gone through a plasma discharge and is therefore highly reactive, or carries along highly reactive species. The plasma treatment is effected by contacting the material 18 with the afterglow. As a consequence, the substrate material is not in direct contact with the plasma.

It will hence be clear that plasma treatments in methods according to the present invention can relate to "direct" plasma treatments, in which the material to be treated is placed in (i.e. is exposed to) the plasma discharge. Plasma treatments may also refer to "indirect" plasma treatments, in which the material to be treated is exposed to a reactive gas stream resulting from a plasma discharge (afterglow).

The pre-treatment step of the method of the present invention comprises, or consists of treating the hydrophobic polymer material (directly or indirectly) with a first atmospheric pressure plasma discharge, which can be a DBD discharge. This first atmospheric pressure plasma discharge is generated in an atmosphere comprising gaseous ammonia. In addition to ammonia, the atmosphere advantageously comprises a gas, with nitrogen and argon being particularly suitable. Particularly advantageous are atmospheres consisting (essentially) of ammonia and nitrogen, or ammonia and argon.

The treatment step, which follows the pre-treatment step, comprises or consists of treating the pre-treated polymer material (directly or indirectly) with a second atmospheric pressure plasma discharge, which can be a DBD discharge. This second atmospheric pressure plasma discharge is generated in an atmosphere comprising a plasma gas, advantageously nitrogen or argon, in which a chemical precursor is introduced. The chemical precursor is advantageously liquid and atomized to an aerosol as described above.

According to an aspect of the invention, a carboxylic acid is used as chemical precursor. Without wishing to be bound by theory, it is believed that the pre-treatment with ammonia generates amino groups ($-NH_2$) on the surface of the polymer material, which readily react with the carboxylic acid group ($-COOH$) of the carboxylic acid.

The carboxylic acid used as chemical precursor in the present invention is a C1-C60, advantageously a C2-C40, advantageously a C3-C20, advantageously a C3-C10, advantageously a C3-C4, advantageously a C3 carboxylic acid having a straight or a branched carbon chain.

The carboxylic acid can be a saturated carboxylic acid, i.e. an acid having no double carbon bonds (no C=C bonds), more particularly, the hydrocarbon substituent (on the carbon of the carboxyl group) of the saturated carboxylic acid having no double carbon bonds.

Alternatively, the carboxylic acid can be an unsaturated carboxylic acid, i.e. an acid having at least one double carbon bond (C=C bond), more particularly, the hydrocarbon substituent (on the carbon of the carboxyl group) of the unsaturated carboxylic acid having at least one double carbon bond. Advantageously, the hydrocarbon substituent of the carboxylic acid can have one, two, three, or more double carbon bonds.

It is believed that the (at least one) C=C double bond leads to a more stable grafting of the carboxylic group on the polymer material, compared to precursors which are not provided with such double carbon bond. A particularly advantageous precursor is acrylic acid. As will be shown in the examples below, the combination of ammonia and acrylic acid plasma treatments results in a surface modification with carboxylic groups which shows improved stability over aging in aqueous environments.

Advantageously, the hydrocarbon substituent of the carboxylic acid is an aliphatic, unsaturated hydrocarbon substituent having a straight carbon chain comprising at least one double carbon bond.

It will be convenient to note that a combination of different precursors, e.g. saturated and unsaturated carboxylic acids, may be used in methods of the invention.

Advantageously, a plasma gas used in the pre-treatment and in the treatment steps is the same. By way of example, it can be advantageous to use nitrogen as plasma gas in the second atmospheric pressure plasma when it is also used in the first plasma. Similarly, if argon is used as plasma gas in the second plasma, it can be advantageous to use it also in the first plasma. It will be convenient to note that a combination of different gasses may be used as plasma gas, e.g. as atmosphere for the plasma discharge. The use of argon gas may be preferred over nitrogen gas.

It will be convenient to note that the operational parameters for plasma generation will depend on the kind of atmosphere used, for example in case of using nitrogen, a dissipated power of the plasma discharge advantageously falls in the range between 150 W/cm² and 600 W/cm², advantageously at least 200 W/cm² and advantageously at most 500 W/cm². In case of using argon, the dissipated power advantageously falls in the range between 10 W/cm² and 100 W/cm². Argon, being an inert gas, allows using lower powers, which may better retain original molecular structures of the precursor, such as the carboxylic group —COOH.

In further aspects, the present invention is related to the surface modified polymer material as obtained, or obtainable, by the above methods. Hence, a substrate, which comprises, or consists of the surface modified polymer material advantageously shows, at the modified surface (also referred to as interface), an improved stability of the water contact angle and/or of the surface energy after aging in water.

Substrates according to aspects of the present invention hence comprise a hydrophobic polymer material having a modified interface (surface), wherein the modified interface comprises carboxylic functional groups grafted on the hydrophobic polymer material. The modified interface can form a grafted layer on the hydrophobic polymer material, e.g. a grafted layer which is discernibly distinct from the bulk material. Advantageously, the modified interface has a contact angle with water, which, measured after immersion of the substrate in water at 20° C. for 3 days, is at least 25° less than a contact angle with water of the (untreated, non-plasma-treated) hydrophobic polymer material, advantageously at least 30° less, advantageously at least 35° less.

Suitable methods for measuring water contact angles (WCA) and surface energy (SE) will be apparent for those skilled in the art.

In the present description, static water contact angle (SWCA) measurements were performed with a Contact angle DATAPHYSICS OCA-2 goniometer, managed by OCA-2 software, by using 3 µl droplets of double distilled water and diiodomethane. The surface energy was calculated based on the Owens-Wendt-Kaelble method using the water and diiodomethane contact angles.

Advantageously, the contact angle with water of the modified interface, measured after immersion in water at 20° C. for 3 days, is equal to or less than 60°, advantageously equal to or less than 57°, advantageously equal to or less than 54°. Advantageously, the contact angle for water on the modified interface, measured immediately after having modified the interface (i.e. immediately after plasma treatment), is equal or less than (about) 35°, advantageously less than (about) 20°. Advantageously, the contact angle for water on the modified interface increases with (about) 45° or less, advantageously (about) 40° or less, advantageously (about) 30° or less, advantageously (about) 20° or less, after having immersed the substrate, including the modified interface, in water at 20° C. for three days, compared to the measurement immediately after having modified the interface.

Advantageously, the modified interface has a surface energy, which, measured after immersion in water at 20° C. for 3 days, differs from a surface energy of the pre-treated and treated (hydrophobic) polymer material before water immersion by 15 mN/m or less, advantageously 12 mN/m or less, advantageously 10 mN/m or less. Advantageously, the surface energy of the interface, measured immediately after having modified the interface (i.e. immediately after plasma treatment), is comprised between (about) 60 to (about) 80 mN/m, advantageously between (about) 65 to (about) 75 mN/m. Advantageously, the surface energy of the modified interface decreases with (about) 20 mN/m or less, advantageously (about) 10 mN/m or less, advantageously (about) 5 mN/m or less, after having immersed the substrate, including the modified interface, in water at 20° C. for three days, compared to the measurement immediately after having modified the interface.

Without wishing to be bound by theory, it is believed that the carboxylic functional groups grafted on the hydrophobic polymer material at the modified interface are covalently bonded to the hydrophobic polymer material, seen the stable hydrophilic character of the modified surface of the polymer material after aging in water (as demonstrated by the examples below).

Advantageously, the density of carboxylic groups (—COOH groups) on the modified interface is at least four times, advantageously at least five times, advantageously at least seven times higher than a density of —COOH groups on a (non-modified) surface of the hydrophobic polymer material. The density of —COOH groups on the modified interface is advantageously at least 1500 pmol/cm².

Advantageously, the substrate is a semi-permeable membrane, advantageously a microfiltration membrane, advantageously made of a fluorinated or sulfonated polymer having a modified interface. The contact angle with water at the modified interface, e.g. at the surface pores, is 60° or less, advantageously 55° or less, advantageously 50° or less, advantageously 45° or less, after immersion in water at 20° C. for three days. Advantageously the modified surface extends between a top surface and a bottom surface of the semi permeable membrane. Advantageously, the modified surface extends over a top (external) surface and over a bottom (external) surface arranged opposite the top surface.

It will be convenient to note that other functional groups can be grafted by methods of the invention in addition to carboxylic groups. These additional groups may contribute to hydrophilicity of the substrate.

EXPERIMENTS

Example 1: Influence of Chemical Precursor—No Pre-Treatment

Hydrophilicity of three polymeric film substrates was examined after plasma treatment in a parallel plate DBD apparatus as shown in FIG. 1, under the conditions indicated in Table 1. The substrates were:

F1: a PVDF film from Solvay Specialty Polymers (Italy), more particularly, PVDF08, a 60 µm thick film, made out of a suspension homopolymer of low molecular weight.

F2: a PVDF film from Solvay Specialty Polymers (Italy), more particularly, PVDF09, a 35 µm thick film, made out of an emulsion homopolymer having a low content of long chain branching.

F3: a PS (i.e. a Sulfonated Polymer) film from Solvay Specialty Polymers (Italy), more particularly, PSU for flat films, a 60 µm thick film of high molecular weight polysulfone, whereas PES for membranes.

The following chemical precursors were used:

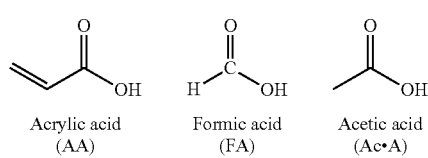

Acrylic acid (AA)  Formic acid (FA)  Acetic acid (Ac·A)

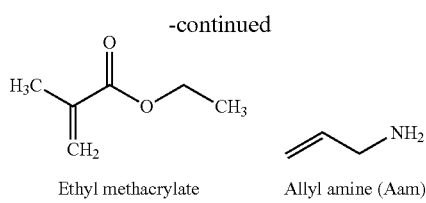

Ethyl methacrylate    Allyl amine (Aam)

No pre-treatment was applied.

TABLE 1

Plasma conditions in Experiment 1.

| code | gas 1 | flow gas 1 mL/min | gas 2 | flow gas 2 mL/min | precursor | gas flow on precursor SLM | F kHz | dissipated P W/cm² | gap mm | pass | speed m/min |
|---|---|---|---|---|---|---|---|---|---|---|---|
| NP_013_Z | N₂ | 20 | — | — | AA | 2 | 1.5 | 450 | 2 | 4 | 4 |
| NP_014_Z | N₂ | 20 | — | — | AA | 2 | 1.5 | 300 | 2 | 4 | 4 |
| NP_015_Z | N₂ | 20 | — | — | formic acid | 2 | 1.5 | 450 | 2 | 4 | 4 |
| NP_016_Z | N₂ | 20 | — | — | formic acid | 2 | 1.5 | 300 | 2 | 4 | 4 |
| NP_017_Z | N₂ | 20 | — | — | acetic acid | 2 | 1.5 | 450 | 2 | 4 | 4 |
| NP_018_Z | N₂ | 20 | — | — | acetic acid | 2 | 1.5 | 300 | 2 | 4 | 4 |
| NP_019_Z | N₂ | 20 | — | — | EMA | 2 | 1.5 | 450 | 2 | 4 | 4 |
| NP_020_Z | N₂ | 20 | — | — | EMA | 2 | 1.5 | 300 | 2 | 4 | 4 |
| NP_021_Z | N₂ | 20 | — | — | Aam | 2 | 1.5 | 450 | 2 | 4 | 4 |
| NP_022_Z | N₂ | 20 | — | — | Aam | 2 | 1.5 | 300 | 2 | 4 | 4 |

Pass: number of passes of the substrate through the DBD apparatus; Speed: speed of the substrate through the apparatus.

A first evaluation of the efficiency of the plasma treatment has been performed by water contact angle (WCA) and surface energy (SE) measurements as described above. These techniques are very fast and straightforward surface characterization methods that allow to qualitatively verify the ability of the plasma to impart a hydrophilic character to the three hydrophobic polymers F1-F3 indicated above. The values of both WCA and SE of the plasma treated samples compared with the native substrate are reported in Table 2 (with plasma conditions indicated in Table 1).

The behaviour of the three polymers is rather comparable. Indeed, for all substrates and for each plasma condition, the WCA is significantly reduced. Moreover the injection of mainly two chemicals out of five, acrylic acid and allyl amine, resulted in the best polymer hydrophilization. For both PVDF and PSU films the WCA values are lower than 10° and the surface energy values are above 70 dynes/cm (or 70 mN/m) after plasma treatment. There seems to be only a very limited effect of the power: the values obtained for both WCA and SE are similar at 450 W and 300 W when the same precursor is injected.

Example 2: Effect of Aging in Air on WCA

Figure 4:
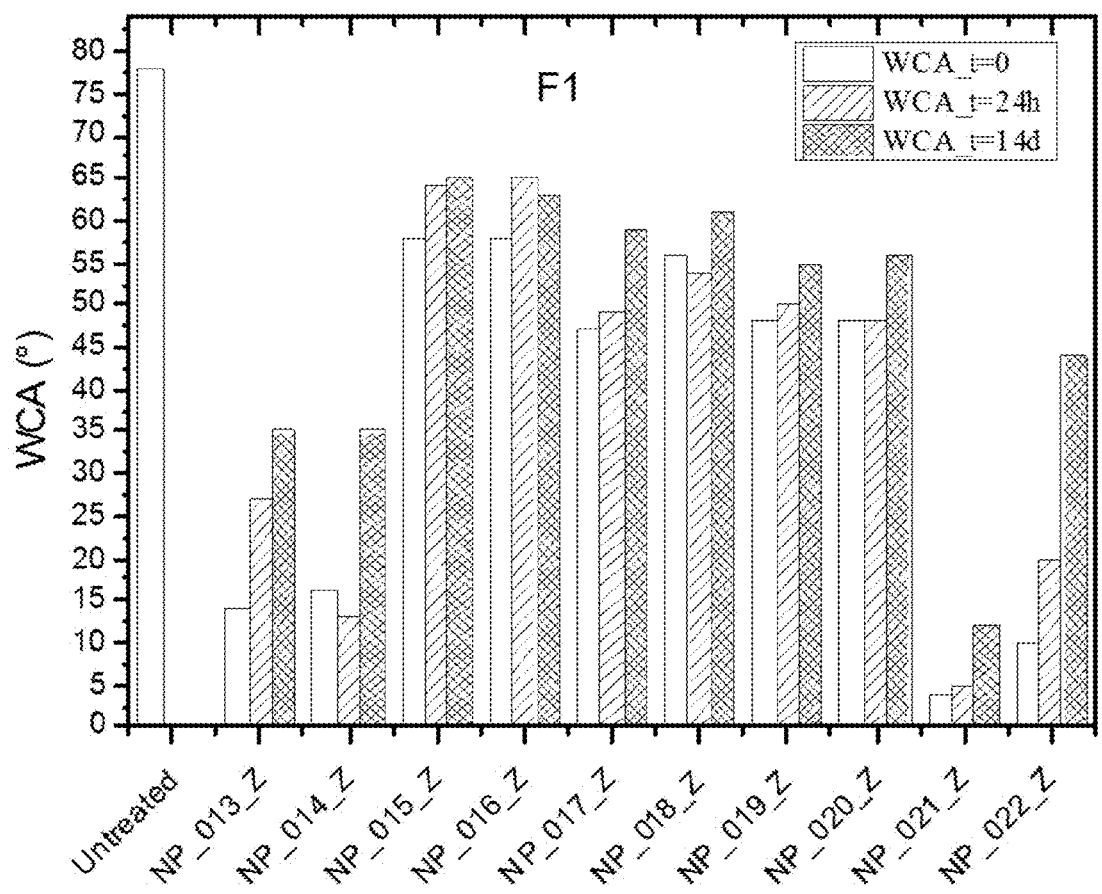
FIG. 4 represents water contact angle measurements as a function of the aging time (t=0, t=24 h, t=14 days) for substrate F1 treated in plasma condition NP_013_Z-NP_022_Z, as listed in Table 1.

Treated samples from Example 1 were used to evaluate the effect of the aging in a non-controlled atmosphere (air) in order to test the stability over time of the plasma grafting of Example 1. The WCA values as a function of the aging time are reported in FIG. 4 for substrate F1 only.

TABLE 2

WCA and SE measurements for substrates F1-F3 treated in plasma conditions NP_013_Z-NP_022_Z and native substrate, as listed in Table 1.

| Test conditions (code) | Substrate F1 WCA (°) | Substrate F1 SE (dynes/cm) | Substrate F2 WCA (°) | Substrate F2 SE (dynes/cm) | Substrate F3 WCA (°) | Substrate F3 SE (dynes/cm) |
|---|---|---|---|---|---|---|
| untreated | 78 | 37 | 81 | 33 | 78 | 49 |
| NP_013_Z | 14 | 74 | 18 | 72 | 7 | 72 |
| NP_014_Z | 16 | 72 | 13 | 73 | 9 | 74 |
| NP_015_Z | 58 | 49 | 54 | 46 | 41 | 62 |
| NP_016_Z | 58 | 48 | 63 | 44 | 41 | 63 |
| NP_017_Z | 47 | 57 | 51 | 53 | 17 | 72 |
| NP_018_Z | 56 | 50 | 59 | 47 | 20 | 72 |
| NP_019_Z | 48 | 57 | 39 | 61 | 16 | 73 |
| NP_020_Z | 48 | 54 | 47 | 53 | 16 | 73 |
| NP_021_Z | 4 | 75 | 5 | 75 | 5 | 75 |
| NP_022_Z | 10 | 74 | 9 | 74 | 6 | 75 |

The behaviour of the three polymer substrates was found comparable and in all conditions the WCA and the SE (data not shown) are rather constant as a function of the aging time. Although a decay of the effect, pointed out indeed by an increase of the WCA values, all the aged samples showed a hydrophilic character significantly higher compared to the native substrates, after 14 days of storage.

treatment without pre-treatment (condition B, compare cases PT with cases PPT+PT). It can also be derived from Table 3 that the hydrophilic character (SE and WCA) are stable under different aging conditions (compare conditions B-E).

TABLE 3

Evaluation of stability of modified surface after aging under different conditions.

| Material | Pre-treatment $N_2 + NH_3$ | | Characterization | | | | |
|---|---|---|---|---|---|---|---|
| | | | A | B | C | D | E |
| PVDF film | R | SE (dynes/cm) | 37 ± 1 | | | | |
| | | WCA (°) | 78 ± 1 | | | | |
| | PT | SE (dynes/cm) | 74 ± 1 | 53 ± 1 | — | — | |
| | | WCA (°) | 9 ± 1 | 60 ± 1 | — | — | |
| | PPT + PT | SE (dynes/cm) | 74 ± 1 | 68 ± 1 | 65 ± 1 | 64 ± 1 | 58 ± 1 |
| | | WCA (°) | 9 ± 1 | 35 ± 1 | 38 ± 1 | 36 ± 1 | 46 ± 1 |
| PES film | R | SE (dynes/cm) | 49 ± 1 | | | | |
| | | WCA (°) | 78 ± 1 | | | | |
| | PT | SE (dynes/cm) | 75 ± 1 | 55 ± 1 | — | — | — |
| | | WCA (°) | 10 ± 1 | 62 ± 1 | — | — | — |
| | PPT + PT | SE (dynes/cm) | 75 ± 1 | 65 ± 1 | 59 ± 1 | 56 ± 1 | 55 ± 1 |
| | | WCA (°) | 10 ± 1 | 35 ± 1 | 52 ± 1 | 56 ± 1 | 63 ± 1 |

R: raw surface (not treated at all); PT: plasma treated without pre-treatment; PPT + PT: plasma pre-treatment followed by plasma treatment.
PT = plasma treatment according to condition NP_013_Z of Table 1 (acrylic acid as precursor).
PPT = plasma pre-treatment in $N_2 + NH_3$ (other conditions same as PT).
Measurement A = prior to water immersion; measurement B = following water immersion (just dipped); measurement C = after 3 days in water (20° C.); measurement D = after 1 h in hot water @ 80° C.; measurement E = after 1 h in a solution $H_2O/C_2H_5OH$ 1:1; SE = Surface energy; WCA = contact angle with water.

Example 3: Effect of Aging in Water on WCA

Figure 5:
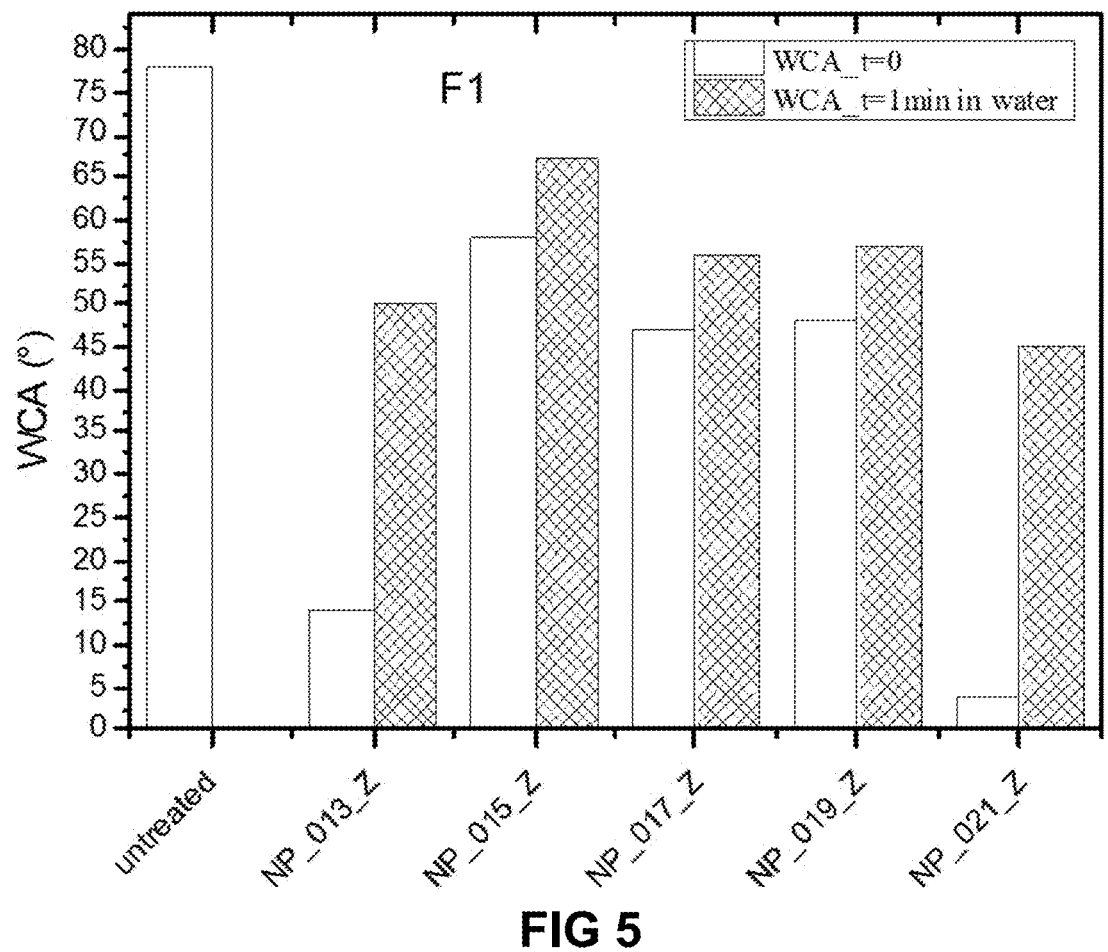
FIG. 5 represents water contact angle measurements for water stability evaluation (t=0, t=1 min in water) for substrate F1 treated in selected plasma conditions (listed in Table 1) for the highest applied power.

In this example the treated substrates of Example 1 were evaluated after very short submersion in demineralised water (at 20° C.). FIG. 5 shows results for substrate F1 and indicates a dramatic increase of the WCA of more than 40° especially for precursors acrylic acid and allyl amine. On the other hand, formic acid, acetic acid and ethyl methacrylate showed relatively good water stability with an increase of the WCA of only 10°. While the water contact angle of all treated samples is still lower than that of the untreated material, the decrease in contact angle after submersion in water appears less interesting from an industrial point of view. Without wishing to be bound by theory, it is believed that following the plasma treatments of Example 1, the monomers (precursors) used for grafting on the hydrophobic polymer films are not covalently bonded and can easily be washed off.

Example 4: Effect of Plasma Pre-Treatment on Water Stability

In order to enhance the water resistance of the plasma modified surfaces, the effect of a gas pre-treatment step of the substrate prior to the plasma deposition according to methods of the invention was evaluated for two substrates (PVDF and PES) and for different aging conditions in liquid. Results are listed in Table 3. It can be seen that the pre-treatment according to aspects of the invention improves the stability of the hydrophilic character over a plasma

Example 5: Comparison Between Saturated and Unsaturated Precursors

Acrylic acid and propionic acid were used as chemical precursors in separate plasma treatments. Propionic acid has the same chemical structure of acrylic acid except for the double C═C bond. In this way, the real effect of the unsaturated bond can be evaluated. In the experiments, both nitrogen and argon were used as plasma gas since the electric field of the discharge as well as the applied power are specific for each gas. An important difference is the fact that argon is an inert plasma carrier gas while nitrogen can react with organic compounds and can be incorporated in plasma polymer coatings. Experiments have been carried out on three polymers provided by Solvay Specialty Polymers: a PVDF film, a PVDF film in which a certain amount of acrylic acid was added to the polymer formulation (referred to as PVDF+AA) and a PES film in a parallel plate DBD apparatus as shown in FIG. 1.

The tests performed are listed in Table 4. The influence of the substrate on the plasma process was found almost negligible according to the surface energy measurements reported in Table 4. The trend of the SE values is indeed the same independently of the material. It was nevertheless found that the stability of the modified surface in water media depends on the chemical precursor injected during plasma treatment. By using acrylic acid, having a double C═C (unsaturated) bond, as chemical precursor, better SE results were obtained as compared to propionic acid, having no such bond (i.e. being saturated). From Table 4 it can also be derived that there were no significant differences between $N_2$ and Ar as plasma gas according to the SE evaluation.

Figure 6:
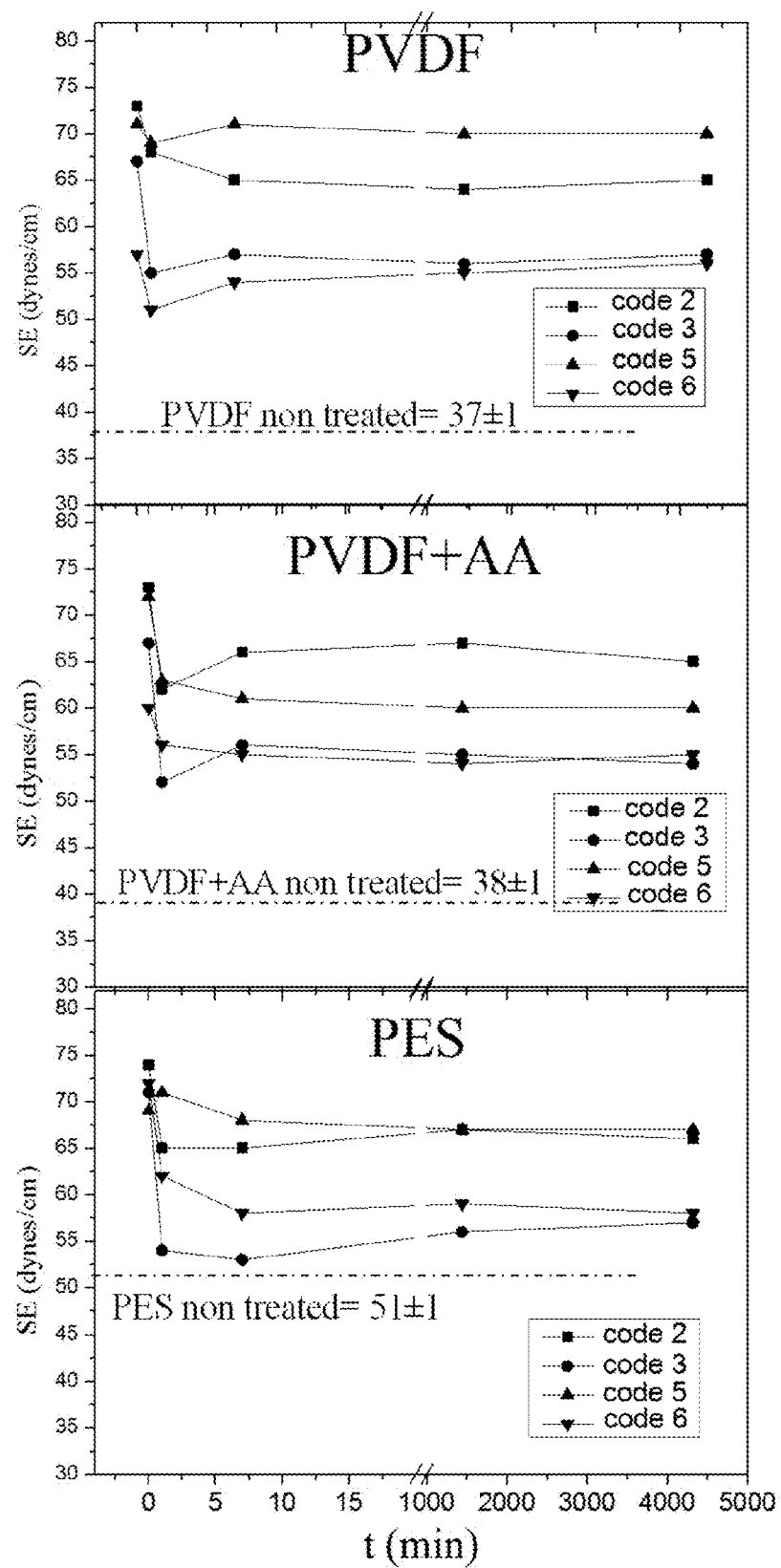
FIG. 6 shows graphs of surface energy (SE) values as a function of water immersion time for PVDF, PVDF+AA, and PES films. Experiments conducted according to Table 4.
Figure 7A:
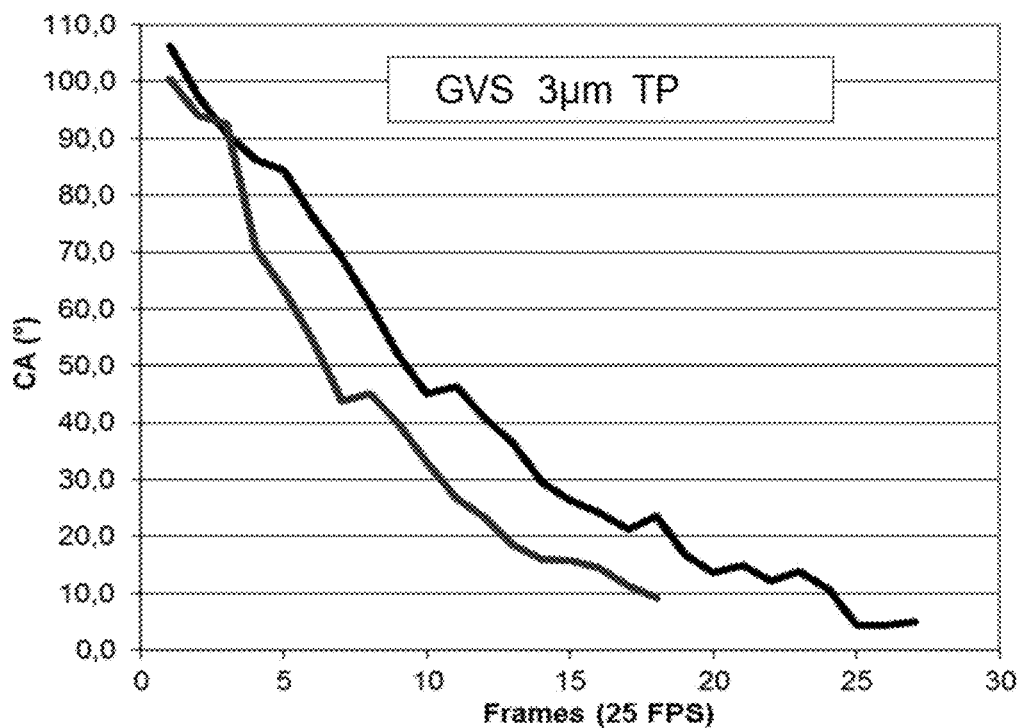
FIGS. 7A to 7F plot graphs of water contact angle versus frames (25 frames/s) obtained from drop penetration video, for three PVDF membranes (see Example 7), at top (TP) and bottom (BT) side. Each graph shows two different measurements performed on the membrane. Plasma conditions are reported in Table 7—Sample 5.
Figure 7B:
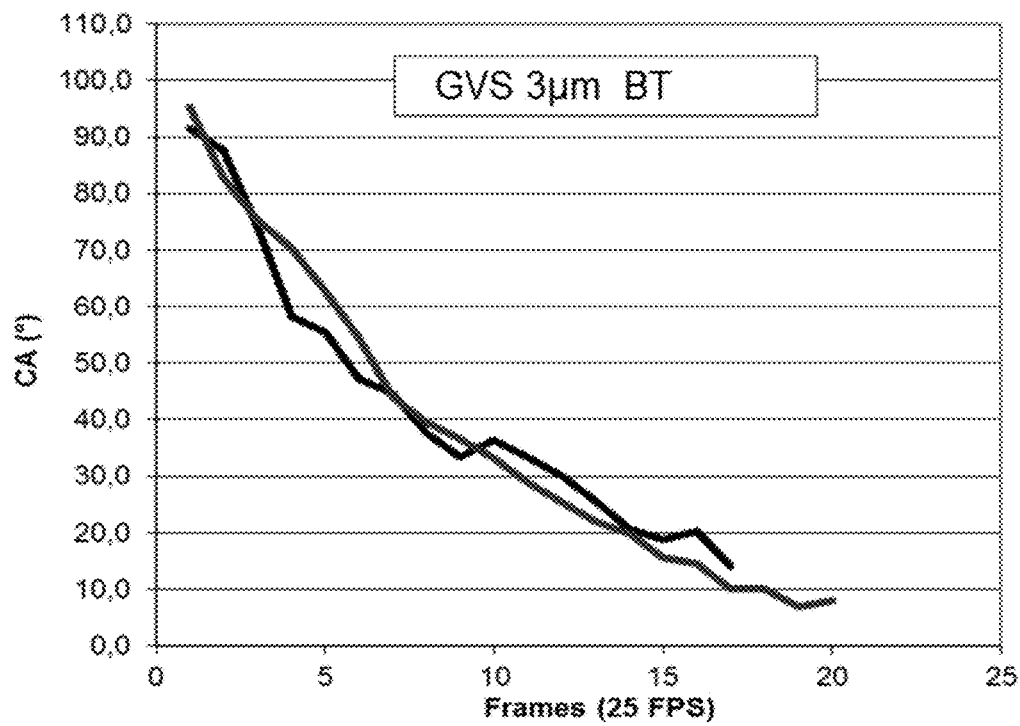
Figure 7C:
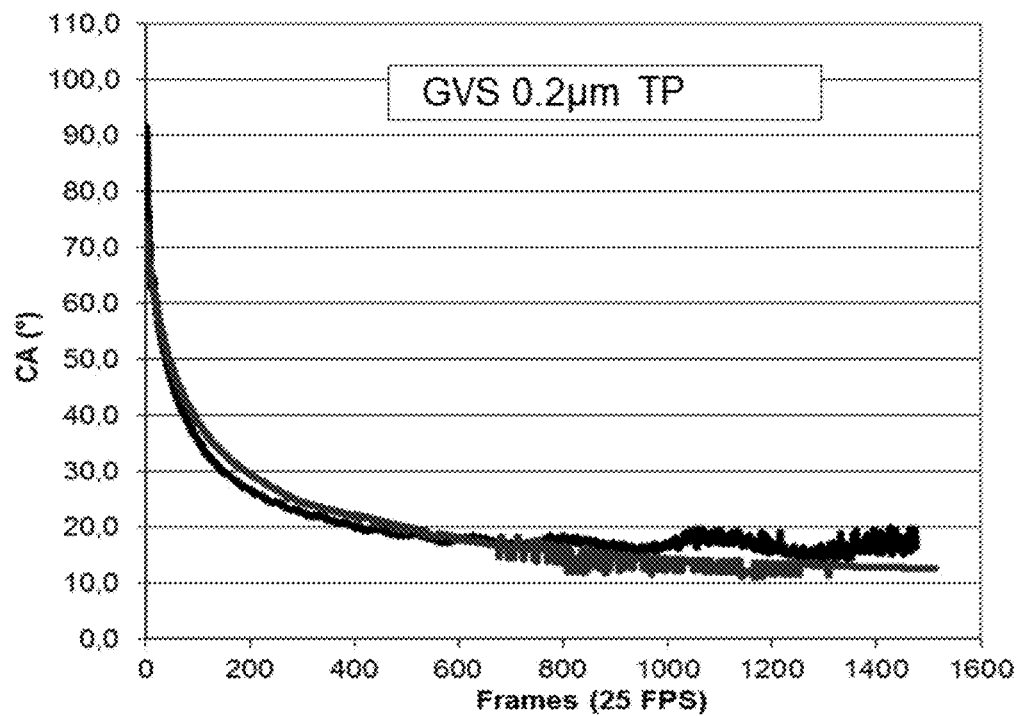
Figure 7D:
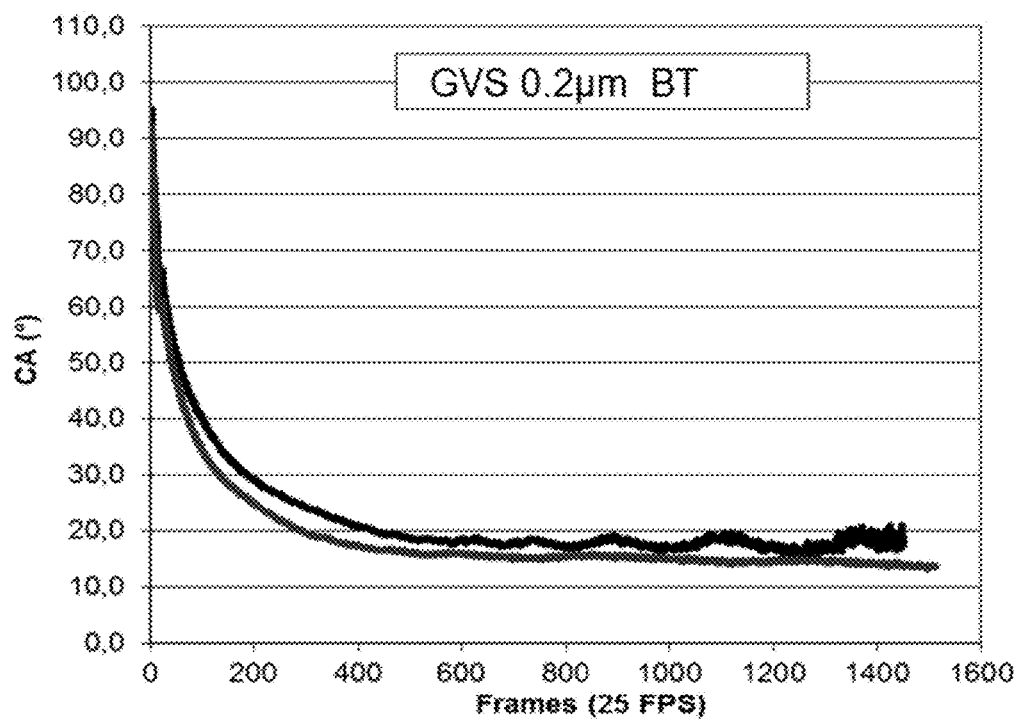
Figure 7E:
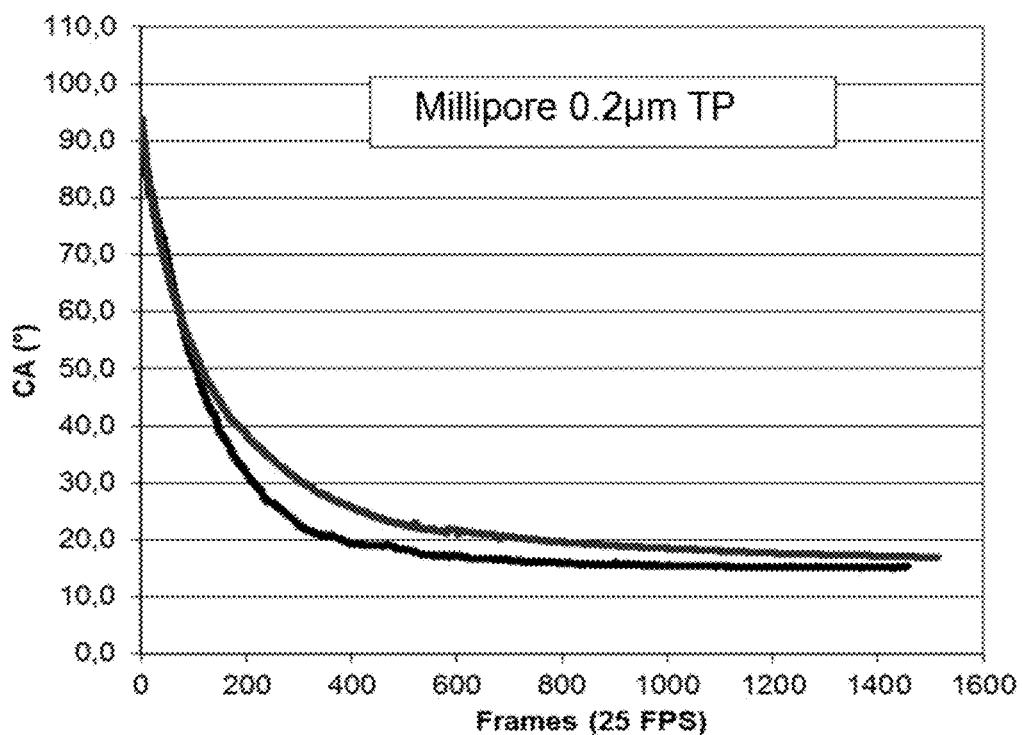
Figure 7F:
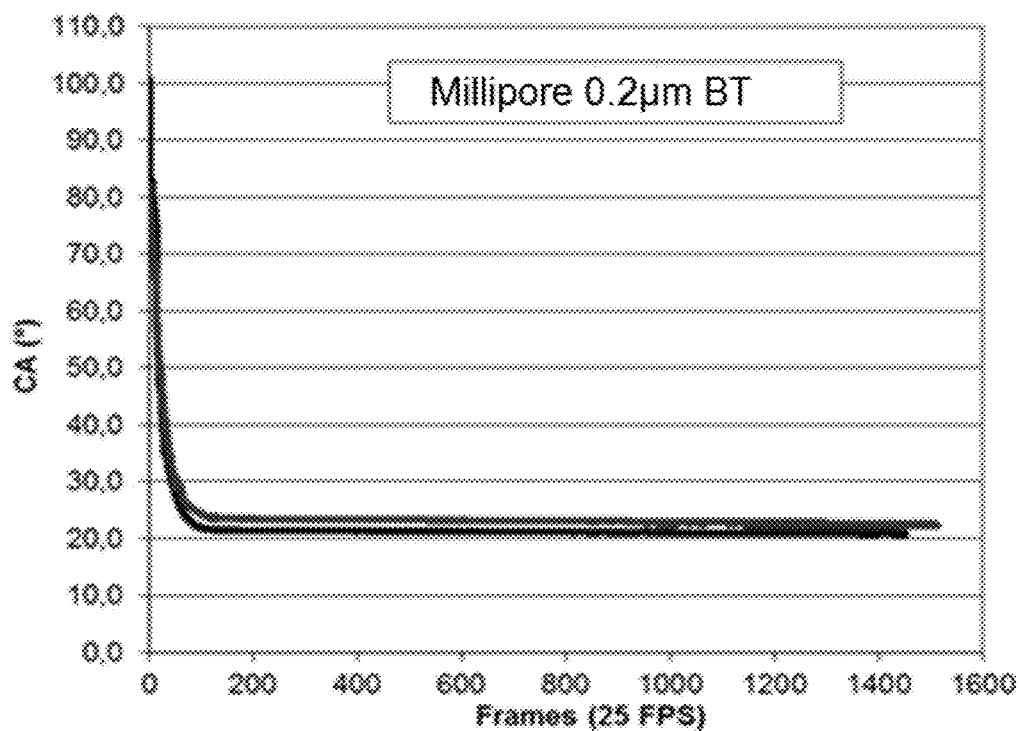

The results of Table 4 are also plotted in FIG. 6, which furthermore plots SE measurements at intermediate time periods. It can be derived from FIG. 6 that the SE stabilizes after less than 10 minutes immersion in water.

TABLE 4

Surface energy (SE) values for different plasma treatments of PVDF, PVDF + AA, and PES films. Plasma power was 450 W/cm² for N₂ and 50 W/cm² for Ar. First row for each material refers to non-treated material surface.

| | Method | | Characterization | |
|---|---|---|---|---|
| Material | STEP 1 Plasma pre-treatment | STEP 2 Plasma treatment with precursor | Method code (see FIG. 6) | SE before water immersion (dynes/cm) | SE after 3 days in water (20° C.) (dynes/cm) |
| PVDF film | — | — | | 37 ± 1 | |
| | $N_2 + NH_3$ | $N_2$ + Acrylic acid | 2 | 74 ± 1 | 68 ± 1 |
| | $N_2 + NH_3$ | $N_2$ + Propionic acid | 3 | 68 ± 1 | 55 ± 1 |
| | $Ar + NH_3$ | Ar + Acrylic acid | 5 | 70 ± 1 | 69 ± 1 |
| | $Ar + NH_3$ | Ar + Propionic acid | 6 | 57 ± 1 | 55 ± 1 |
| PES film | — | — | | 49 ± 1 | |
| | $N_2 + NH_3$ | $N_2$ + Acrylic acid | 2 | 74 ± 1 | 67 ± 1 |
| | $N_2 + NH_3$ | $N_2$ + Propionic acid | 3 | 70 ± 1 | 55 ± 1 |
| | $Ar + NH_3$ | Ar + Acrylic acid | 5 | 70 ± 1 | 68 ± 1 |
| | $Ar + NH_3$ | Ar + Propionic acid | 6 | 70 ± 1 | 55 ± 1 |
| PVDF + AA film | — | — | | 38 ± 1 | |
| | $N_2 + NH_3$ | $N_2$ + Acrylic acid | 2 | 74 ± 1 | 65 ± 1 |
| | $N_2 + NH_3$ | $N_2$ + Propionic acid | 3 | 67 ± 1 | 55 ± 1 |
| | $Ar + NH_3$ | Ar + Acrylic acid | 5 | 73 ± 1 | 63 ± 1 |
| | $Ar + NH_3$ | Ar + Propionic acid | 6 | 60 ± 1 | 55 ± 1 |

Example 6: Quantification of —COOH Groups on Modified Surface

A dyes method for COOH/NH₂ quantification, based on: C. Geismann, M. Ulbricht in Macromol. Chem. and Phys. 2005, Vol. 206, 268-281; and A. Papra, H. G. Hicke and D. Paul in J. Appl. Polym. Sci. 1999, Vol 74, 1669-1674 was used to quantify the amount of grafted carboxyl groups versus amine groups present on the surface.

The procedure for —COOH groups quantification consists of the following 4 steps:
1) Bind: Membrane samples were shaken overnight in a solution of 10 mg/L thionine acetate (CAS 78338-22-4) in ethanol at room temperature;
2) Wash: Rinsed three times with ethanol for 30 s;
3) Elute: Immersed in 10 mL of a solution of 0.01 N HCl in a 1:1 mixture of ethanol and water and shaking for 1.5 h;
4) Measure fluorescence spectrum (excitation 594 nm, measure 620 nm).

The solutions to be made for the different steps pointed out above:
1) Thionine acetate:
10 mg/l=1 mg/100 ml: make concentrated solution first of 100 mg thionine acetate in 100 ml (ethanol K3L1).
Dilute this solution by taking 1 ml of this solution in a 100 ml flask and dilute with ethanol.
This gives you a solution of 10 mg/l thionine acetate.
2) After shaking the material overnight, the samples should be rinsed with ethanol (100 ml in a glass and wash each sample for some time).
3) Solution: 0.01M HCl in 1:1 mixture of ethanol/water: 125 ml of ethanol placed in a flask of 250 ml (100 ml via 100 ml volumetric flask then 5×5 ml with a volumetric pipet)+125 ml of water (same as the ethanol)+250 µl HCl (35% HCl K4L4) (this with a micropipette set on 250 µl).

The procedure for —NH₂ groups quantification consists of the following 4 steps:
1) Bind: Membrane samples were shaken overnight in a solution of 500 µmol/L Acid Orange II (CAS 633-96-5) in water (pH 3, HCl) at room temperature;
2) Wash: The samples were washed three times with water (pH 3);
3) Elute: Immersed in 10 mL of water (pH 12, NaOH). Shake for 15 min;
4) Measure fluorescence spectrum at 479 nm.

The following solutions were made for the different steps pointed out above:
1) acid orange: 500 µmol→0.0175 g in 100 ml water pH 3 (HCl) flask, again make solution 100 times more concentrated: 1.75 g acid orange (K1L7) in 100 ml flask with Water pH 3 (0.001M HCl see point 2). Take 1 ml from this solution and add 1 ml of 0.1M HCl and dilute till 100 ml with water.
2) HCl PH 3: 35% HCl in K4L4→super concentrated=10M. pH 3=diluted 10000 times. Make a solution 100 times diluted: 1 ml of 35% HCl in flask of 100 ml→100 times diluted=0.1M HCl. Take 1 ml of this solution in a flask of 100 ml=0.001M HCl=pH 3=10000 times diluted.
3) NaOH: 250 ml water in flask of 250 ml+100 mg NaOH=Water pH 12.

The above dye method was applied to the substrates treated in Example 5. Results are reported in Table 5, which shows the ability of methods of the invention to target a specific surface chemistry. The relatively "mild" nature of atmospheric plasmas when compared with vacuum plasmas, where active species can accumulate a relatively large amount of energy, causes chemicals to maintain their original structure to a large extent. By selecting chemical precursors with specific functional groups, it can be expected that these functional groups will be retrieved at the surface of the plasma treated substrate.

In fact, the amount of COOH groups is directly correlated to the chemicals injected and to the plasma gas used, i.e. to the plasma parameters. The use of acrylic acid led to a more efficient functionalization both in $N_2$ and Ar plasmas when compared with propionic acid. Moreover the use of argon enhances significantly the amount of carboxylic groups grafted on the surface. Without wishing to be bound by theory, a possible explanation could be related to the retention of the chemical structure of the precursor. By comparing acrylic acid and propionic acid, the presence of the double bond in the former promotes a better retention of the chemical structure of acrylic acid. In fact in this case the most reactive bond of the molecule is its double C=C bond, reducing the interaction of the carboxylic groups with the reactive species in the plasma. Similarly, when the amount of COOH groups is compared for $N_2$ and Ar plasma treatment with acrylic acid, the highest amount of COOH groups are measured in the case of Ar deposition. Indeed this is directly correlated to the nature of the electric field typical for each gas: by applying a power of 50 W/cm$^2$ (instead of 450 W/cm$^2$ with $N_2$) the retention of the acrylic acid molecular structure is promoted and a higher amount of COOH groups are grafted on the surface. In addition, nitrogen atoms can be incorporated in the plasma polymer during plasma polymerization, possibly destroying functionalities present in the monomer, while this is not the case for argon.

improve the performance of such membranes in aqueous environments.

In this example, three PVDF membranes were tested:
a PVDF membrane with 0.2 µm pore size (GVS Group, Italy);
a PVDF membrane with 3 µm pore size (GVS Group, Italy); and
a PVDF membrane of 0.2 µm pore size (Millipore, US).
The membranes were treated with a parallel plate DBD apparatus as described in relation to FIG. 2, hence, with application of suction pressure (vacuum or slight underpressure) by the vacuum pump 22 to suck the reactive plasma gas into the internal pores of the membrane, until the opposite side.

The effect of the plasma treatment on the surface energy of the membranes was evaluated by monitoring the contact angle over time. This measurement gives an indication of the spreading of water droplets on the surface, which is mainly influenced by the pores dimension and the plasma treatment. For all substrates the hydrophilization of both top and bottom side of the membrane, meaning the side directly in contact with the plasma and the one in contact with the meshed electrode was evaluated to check the penetration depth of the plasma treatment in the pores.

The contact angle values for untreated membranes are reported in Table 6. All native substrates have a WCA higher than 130°; the 3 µm membrane can also be considered as a super-hydrophobic substrate having a WCA higher than 140°, due to the combination of the surface structure and the PVDF chemistry.

The membranes were subjected to plasma treatments as listed in Table 7. To evaluate the combined effect of the plasma treatment and the morphology, videos of the drop penetration on the treated surface were recorded by Solvay. The WCA values have then been plotted as a function of the frames. The effect of the plasma treatment on the membrane hydrophilization is clearly depended from the pores size as

TABLE 5 quantification of the COOH-groups (with thionine acetate dye- as described above) and NH$_2$ (with Acid Orange II dye- as also described above) for plasma conditions reported in Example 5, compared to the untreated polymer.

| | PVDF | | PVDF + AA | | PES | |
|---|---|---|---|---|---|---|
| Test condition | COOH (pmol/cm$^2$) | NH2 (pmol/l/cm$^2$) | COOH (pmol/cm$^2$) | NH2 (pmol/l/cm$^2$) | COOH (pmol/cm$^2$) | NH2 (pmol/l/cm$^2$) |
| 0 | 42 | 241 | 229 | 169 | 548 | 88 |
| 1 | 34 | 264 | 428 | 195 | 365 | 23 |
| 2 | 1609 | 139 | 2762 | 28 | 1244 | 32 |
| 3 | 68 | 201 | 553 | 73 | 374 | 34 |
| 4 | 2 | 117 | 446 | 209 | 101 | 243 |
| 5 | 11239 | 326 | 9290 | 161 | 12532 | 244 |
| 6 | 1399 | 254 | 1926 | 239 | 1067 | 179 |

Test conditions: '0' = untreated polymer; "1" = $N_2$ + $NH_3$ pre-treatment only; "2" = $N_2$ + $NH_3$ pre-treatment followed by $N_2$ + acrylic acid treatment; "3" = $N_2$ + $NH_3$ pre-treatment followed by $N_2$ + propionic acid treatment; "4" = Ar + $NH_3$ pre-treatment only; "5" = Ar + $NH_3$ pre-treatment followed by Ar + acrylic acid treatment; "6" = Ar + $NH_3$ pre-treatment followed by Ar + propionic acid treatment.
All other conditions same as in Example 5.

Example 7: PVDF Microfiltration Membranes

An interesting application of methods according to the invention is for improving the hydrophilic properties of semi-permeable membranes, such as microfiltration membranes. PVDF membranes are highly hydrophobic, and making the surface of the pores hydrophilic could signifi seen in graphs plotted in FIGS. 7A to 7F. The water drop is completely absorbed in the GVS_3 µm membrane in less than one second, while the WCA stabilizes at a constant value of 15°-20° for both GVS_0.2 µm and Millipore_0.2 µm membranes. It can be seen from FIGS. 7A to 7F that the plasma treatment performed on the top side is able to penetrate through the pores cavity to functionalize the bottom side of the membrane as the same WCA trends are observed for top and bottom sides of the membranes in FIGS. 7A to 7F.

In an experiment following sample 7 of Table 7 (data not shown), comparable hydrophilization was gained on all the membranes when 15 passes of plasma treatment are performed instead of 30.

Figure 8A:
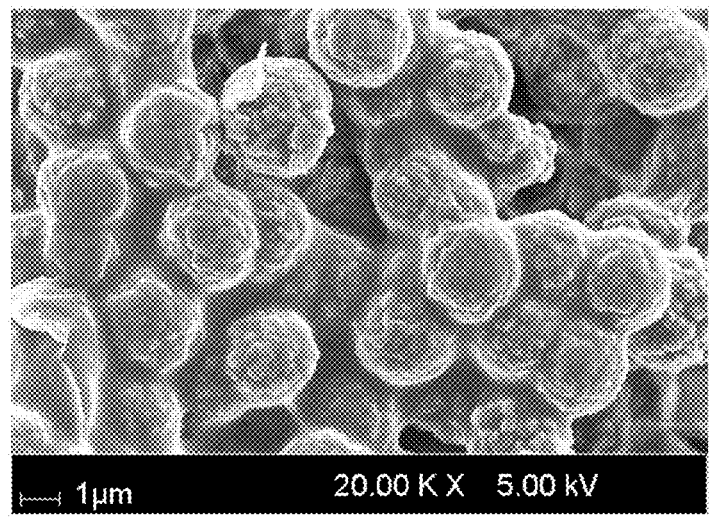
FIGS. 8A to 8C show SEM pictures for GVS_3 μm membrane (see Example 7) in three conditions.
Figure 8B:
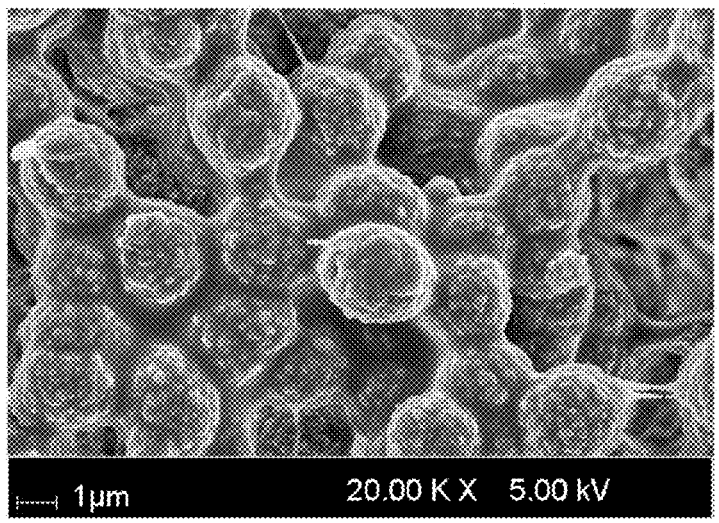
Figure 8C:
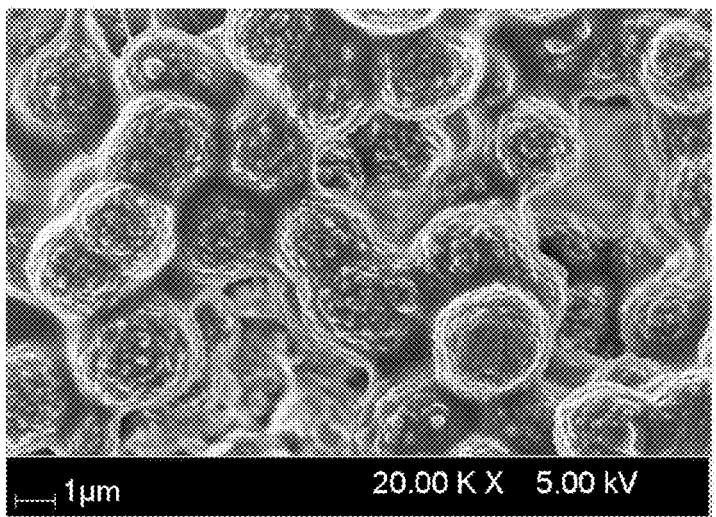
Figure 9A:
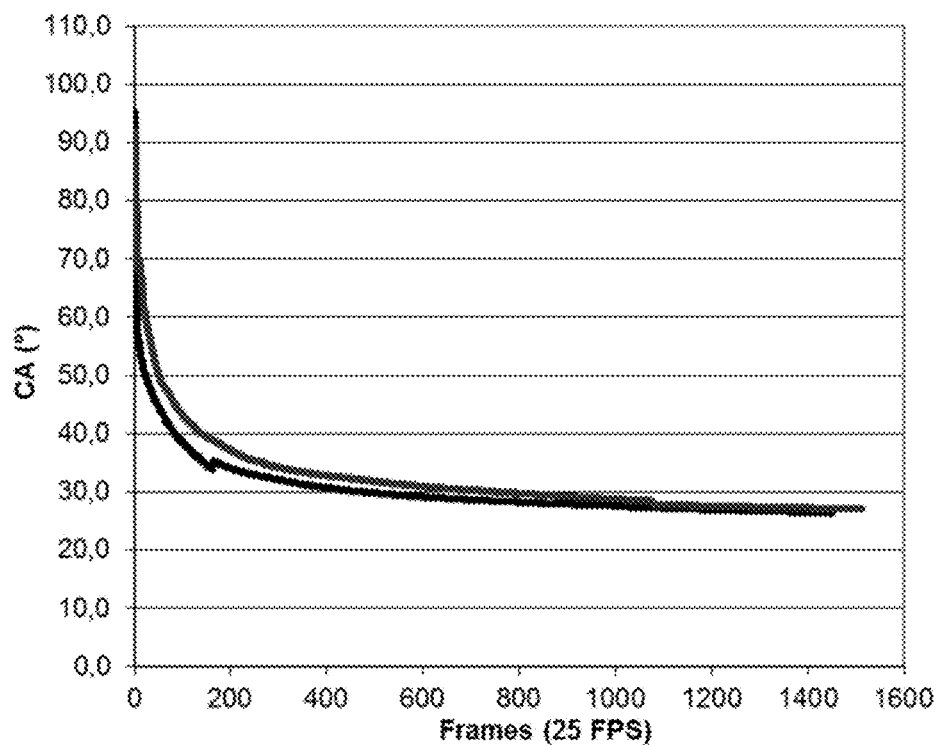
FIGS. 9A to 9D show plasma treated Millipore_0.2 μm membrane with Ar+$NH_3$ pre-treatment and acrylic acid grafting (30 passes) (see Example 9): the evolution of the CA (contact angle with water) is plotted as a function of the immersion time for the top and bottom side based on image analysis (as in example 7, FIGS. 7A to 7F). Each figure shows two different measurements performed on the membrane.
Figure 9B:
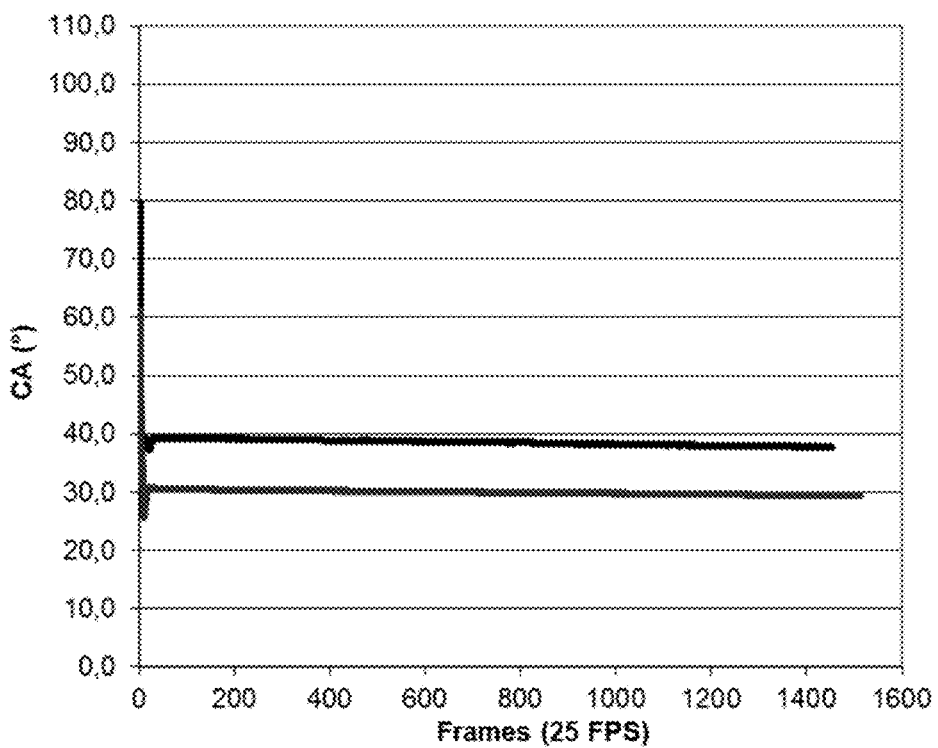
Figure 9C:
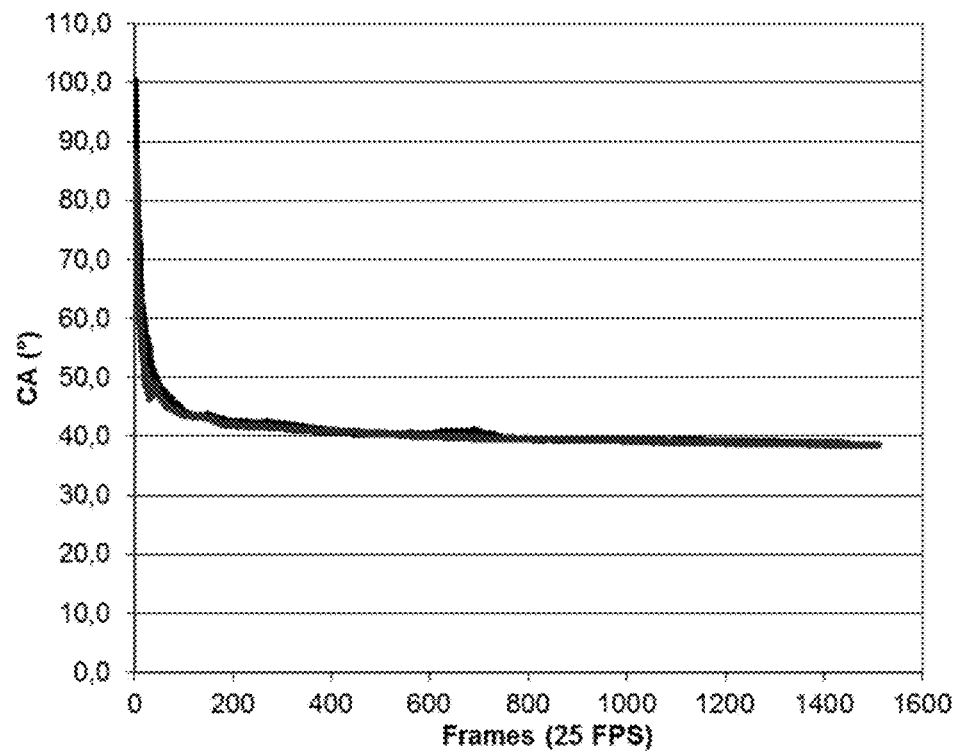
Figure 9D:
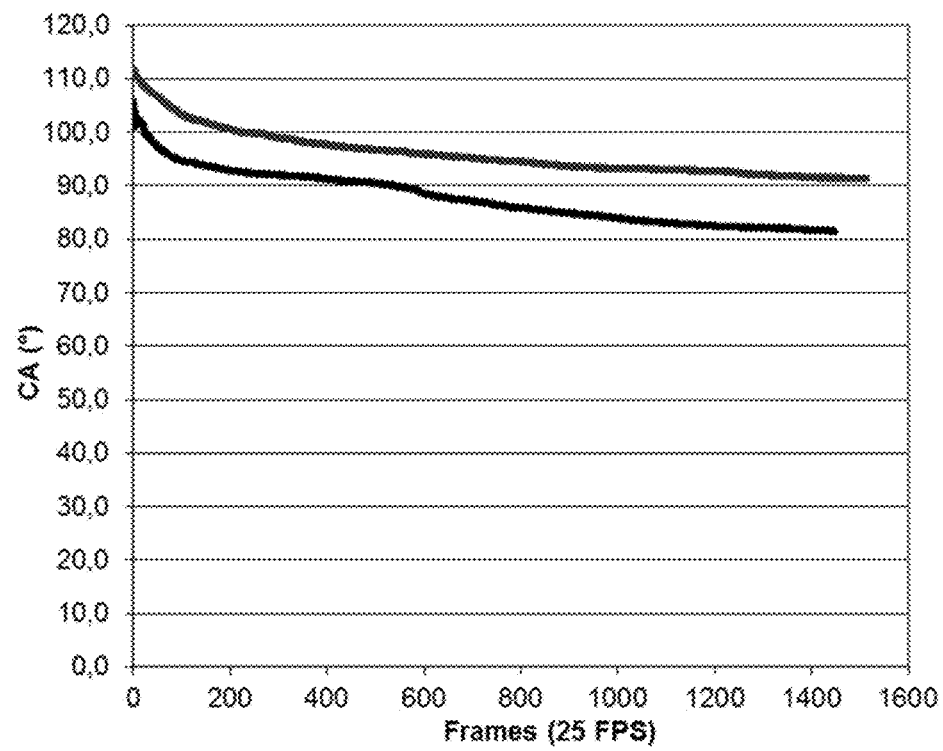

Scanning electron microscope (SEM) images have been taken to verify the integrity of the membrane structure after treatment. As an example, FIGS. 8A to 8C show SEM pictures of the GVS_3 μm membrane which show that the pore structure is not modified or damaged during the plasma treatment.

TABLE 6

Water contact angle for untreated membranes.

| Sample untreated | Side | WCA (°) | St. Dev |
|---|---|---|---|
| Millipore 0.2 μm | TOP | 132.0 | 2.4 |
| | BOTTOM | 129.1 | 2.2 |
| GVS 0.2 μm | TOP | 135.1 | 3.3 |
| | BOTTOM | 141.9 | 4.4 |
| GVS 3 μm | TOP | 151.3 | 2.2 |
| | BOTTOM | 150.2 | 1.3 |

TABLE 7

Experimental condition for plasma treatments on PVDF membranes

| code | gas 1 | flow gas 1 mL/min | precursor | gas flow on precursor SLM | F kHz | dissipated P W/cm$^2$ | gap mm | pass | speed m/min |
|---|---|---|---|---|---|---|---|---|---|
| Sample 1 | N$_2$ | 20 | AA | 2 | 1.5 | 400 | 2 | 10 | 4 |
| Sample 2 | N$_2$ | 20 | AA | 2 | 1.5 | 400 | 2 | 30 | 4 |
| Sample 3 | N$_2$ | 20 | AA | 2 | 1.5 | 400 | 2 | 30 | 2 |
| Sample 4 | N$_2$ | 20 | AA | 2 | 1.5 | 200 | 2 | 30 | 2 |
| Sample 5 | N$_2$ | 20 | AA | 2 | 1.5 | 50 | 2 | 30 | 2 |
| Sample 6 | N$_2$ | 20 | AA | 2 | 1.5 | 50 | 2 | 2*15 | 2 |
| Sample 7 | N$_2$ | 20 | AA | 2 | 1.5 | 50 | 2 | 15 | 2 |

In this example, also water flow (WF) and bubble point (BP) measurements were performed for the GVS_3 μm membranes. These are specific and widely used techniques for membrane performance testing. The WF measurement assesses the ability of the plasma treatment to increase the water flow through the membrane at a certain pressure, as such giving an indication of the effect of hydrophilization. The bubble point, instead, is related to the dimension of the biggest pores. In fact an increase in its value after plasma treatment could be an indication of damage to the pores while a reduction of the BP could indicate pores occlusion. Indeed, the BP value after plasma treatment should be comparable to the untreated membrane as indication that no damages or occlusion occurred. The membrane performance of the GVS_3 μm membrane is significantly improved after the plasma treatment. Independently from the treatment time (15 passes, 15+15 passes or 30 passes—samples 7, 6 or 5 of Table 7), the water flow increases from 360 ml/min/cm$^2$/bar (GVS_3 μm membrane without functionalization—data provided by GVS Group) to 878, 899 and 832 ml/min/cm$^2$/bar (for Samples 5, 6 and 7 respectively) while the BP is comparable before and after treatment (0.14 bar). Therefore it can be concluded that an effective functionalization of the membrane occurred without damaging the pore structure.

Further tests are already foreseen to optimize the treatment time of the process: according to the present results, it is expected that shorter treatment times could assure the same hydrophilization while process cost and scalability would be improved.

Example 8: Quantification of COOH Groups with Dyes Method

The same dye method of Example 6 was used to quantify the COOH groups on the surface of the membranes for the PVDF GVS_3 μm membrane and GVS_0.2 μm membrane. The results are listed in Table 8.

TABLE 8

COOH quantification results of the membrane surface according to dye method of Example 6.

| | Plasma process | | COOH density |
|---|---|---|---|
| Membrane | Pre-treatment | Treatment | (pmol/cm$^2$) |
| GVS 3 μm | — | — | 1804 |
| GVS 3 μm | Ar + NH$_3$ | Ar + acrylic acid | 9874 |
| GVS 3 μm | — | Ar + acrylic acid | 2107 |

TABLE 8-continued

COOH quantification results of the membrane surface according to dye method of Example 6.

| | Plasma process | | COOH density |
|---|---|---|---|
| Membrane | Pre-treatment | Treatment | (pmol/cm$^2$) |
| GVS 0.2 μm | — | — | 209187 |
| GVS 0.2 μm | Ar + NH$_3$ | Ar + acrylic acid | 1301088 |

Example 9: Stability of the Plasma for Water Immersion

Stability tests in water media have been performed for the Millipore_0.2 μm membrane (of example 7), which was immersed in water for 96 h. A comparison of the contact angle (CA) variation as a function of the immersion time is plotted in FIGS. 9A to 9D. Both the top and the bottom side of the membrane were analysed. The top side of the membrane is not subjected to any variation of the CA; the plasma treatment is stable over the immersion time. In this case the COOH groups grafted to the surface will probably be covalently bonded to it. An opposite behaviour is observed for the CA values for the bottom side of the treated membrane, which has not been in direct contact with the plasma. A possible reason of the different behaviour of the two sides could be related to the different interaction with the plasma: the top one is in contact with the plasma experiencing a direct activation of its surface, while the functionalization of the bottom is mainly due to the migration of the plasma active species through the membrane. The latter may give rise to a loss of reactivity.

Example 10: Stability of the Plasma Treatment During Accelerated Aging and Sterilization Plasma treated GVS_3 µm membranes, have been further characterized to test the stability of the plasma treatment in more drastic conditions:
1. Acceleration of the aging up to 1 year (3 weeks in oven at 60° C.);
2. Steam sterilization (21 min at 121° C.).

The values of the water flow (WF) and bubble point (BP) after accelerated aging and steam sterilization are reported in Table 9 and compared to those of the membrane without aging. Both after accelerated aging and after steam sterilization, only little variation in the effect of the plasma treatments was observed. The WF and BP after aging are similar to the values without accelerated aging and thus it can be concluded that the plasma treatment can withstand accelerated aging and steam sterilization without problem.

TABLE 9

Water flow (WF) and bubble point (BP) for plasma treated GVS_3 µm membrane (30, 15 + 15 ad 15 passes-Table 7) after accelerated aging and steam sterilization.

| | Membrane treated | After sterilization | Variation [%] | After aging | Variation [%] |
|---|---|---|---|---|---|
| | | WF [ml/min/cm$^2$/bar] | | | |
| Sample 5 | 878 | 842 | −4% | 915 | 4% |
| Sample 6 | 899 | 932 | +4% | 910 | 1% |
| Sample 7 | 832 | 855 | +3% | 874 | 5% |
| | | BP [bar] | | | |
| Sample 5 | 0.14 | 0.16 | +12% | 0.15 | 7% |
| Sample 6 | 0.14 | 0.16 | +12% | 0.15 | 5% |
| Sample 7 | 0.14 | 0.16 | +12% | 0.15 | 5% |

Example 11: Testing of Membrane Fouling

The PVDF GVS 3 µm membrane after plasma treatment according to the second row of Table 8 was tested in a drinking water pilot plant with spiral wound modules during 5 days of operation. It was observed that membranes treated with methods according to the invention showed 25% less fouling compared to untreated membranes. Without wishing to be bound by theory, it is believed that the reduction in fouling is due to the hydrophilization of the membrane.

The invention claimed is:

1. Method of enhancing hydrophilicity of a hydrophobic polymer material, comprising:

pre-treating the hydrophobic polymer material, the pre-treating comprising treating the hydrophobic polymer material with a first atmospheric pressure plasma discharge in a first atmosphere comprising ammonia to obtain a pre-treated polymer material; and treating the pre-treated polymer material with a second atmospheric pressure plasma discharge in a second atmosphere in which an aerosol of a carboxylic acid is introduced.

2. Method of claim 1, wherein the carboxylic acid is an unsaturated carboxylic acid, having at least one double carbon bond.

3. Method of claim 2, wherein the first and/or second atmosphere comprise nitrogen or argon.

4. Method of claim 3, wherein the first atmosphere essentially consists of ammonia and a gas selected from one of nitrogen and argon.

5. Method of claim 1, wherein the first and/or second atmosphere comprise nitrogen or argon.

6. Method of claim 5, wherein the first atmosphere essentially consists of ammonia and a gas selected from one of nitrogen and argon.

7. Method of claim 1, wherein the hydrophobic polymer material is a material having a contact angle with water of at least 65°.

8. Method of claim 1, wherein the hydrophobic polymer material is a material essentially made of a fluorinated or sulfonated polymer.

9. Method of claim 8, wherein the hydrophobic polymer material is selected from the group consisting of: polytetrafluoroethylene (PTFE), polyvinylidene fluoride (PVDF), perfluoroalkoxy alkane (PFA), polyethersulfone (PES), and polysulfone (PSU).

10. Method of claim 1, wherein the hydrophobic polymer material is a semi-permeable membrane.

11. Method of claim 10, wherein pre-treating and/or treating the hydrophobic polymer material comprises arranging the hydrophobic polymer material on a porous support and applying suction pressure through the porous support during atmospheric pressure plasma discharge.

12. Method of claim 1, wherein the hydrophobic polymer material is a powder.

13. Method of claim 12, wherein pre-treating and/or treating the hydrophobic polymer material comprises arranging the hydrophobic polymer material on a porous support and applying suction pressure through the porous support during atmospheric pressure plasma discharge.

14. Method of claim 1, wherein the aerosol consists of droplets having a size in the range between 10 and 200 nm.

15. Method of claim 1, wherein the carboxylic acid is acrylic acid.

16. Method of claim 15, wherein the first and/or second atmosphere comprise nitrogen or argon.

17. Method of claim 16, wherein the first atmosphere essentially consists of ammonia and a gas selected from one of nitrogen and argon.

* * * * *